(12) United States Patent
Zhamu et al.

(10) Patent No.: US 10,446,333 B2
(45) Date of Patent: Oct. 15, 2019

(54) ROLLED SUPERCAPACITOR ELECTRODE HAVING HIGHLY ORIENTED FLAKES OF EXFOLIATED OR EXPANDED GRAPHITE AND PRODUCTION PROCESS

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Nanotek Instruments Group, LLC, Dayton, OH (US)

( * ) Notice: Subject to any disclaimer, the term of this patent is extended or adjusted under 35 U.S.C. 154(b) by 109 days.

(21) Appl. No.: 15/671,611

(22) Filed: Aug. 8, 2017

(65) Prior Publication Data

US 2019/0051466 A1    Feb. 14, 2019

(51) Int. Cl.

| | |
|---|---|
| *H01M 10/0525* | (2010.01) |
| *H01G 11/42* | (2013.01) |
| *H01G 11/10* | (2013.01) |
| *H01G 11/24* | (2013.01) |
| *H01G 11/26* | (2013.01) |
| *H01G 11/46* | (2013.01) |
| *H01G 11/48* | (2013.01) |
| *H01G 11/52* | (2013.01) |
| *H01G 11/58* | (2013.01) |
| *H01G 11/66* | (2013.01) |
| *H01G 11/86* | (2013.01) |
| *H01M 2/02* | (2006.01) |

(52) U.S. Cl.
CPC ............. *H01G 11/42* (2013.01); *H01G 11/10* (2013.01); *H01G 11/24* (2013.01); *H01G 11/26* (2013.01); *H01G 11/46* (2013.01); *H01G 11/48* (2013.01); *H01G 11/52* (2013.01); *H01G 11/58* (2013.01); *H01G 11/66* (2013.01); *H01G 11/86* (2013.01); *H01M 2/022* (2013.01)

(58) Field of Classification Search
CPC ..................... H01M 10/0525; H01M 10/054
See application file for complete search history.

(56) References Cited

U.S. PATENT DOCUMENTS

| | | |
|---|---|---|
| 4,880,508 A | 11/1989 | Aldissi |
| 5,109,070 A | 4/1992 | Epstein et al. |
| | (Continued) | |

OTHER PUBLICATIONS

PCT/US18/43413 International Search Report and Written Opinion dated Oct. 11, 2018, 7 pages.

*Primary Examiner* — Olatunji A Godo

(57) ABSTRACT

Provided is rolled supercapacitor comprising an anode, a cathode, a porous separator, and an electrolyte, wherein the anode contains a wound anode roll of an anode active material having an anode roll length, width, and thickness and the anode active material contains flakes of graphite worms or expanded graphite that are oriented substantially parallel to the plane defined by the anode roll length and width; and/or the cathode contains a wound cathode roll of a cathode active material having a cathode roll length, width, and thickness, wherein the cathode active material contains flakes of graphite worms or expanded graphite that are oriented substantially parallel to the plane defined by the cathode roll length and width; and wherein the anode roll width and/or the cathode roll width is substantially perpendicular to the separator.

31 Claims, 11 Drawing Sheets

(56) References Cited

U.S. PATENT DOCUMENTS

2009/0061312 A1\* 3/2009 Zhamu ................ H01G 11/34
429/217
2009/0092747 A1\* 4/2009 Zhamu ................ H01G 9/058
427/80

\* cited by examiner

ROLLED SUPERCAPACITOR ELECTRODE HAVING HIGHLY ORIENTED FLAKES OF EXFOLIATED OR EXPANDED GRAPHITE AND PRODUCTION PROCESS

FIELD OF THE INVENTION

The present invention relates generally to the field of supercapacitor and, more particularly, to an exfoliated or expanded graphite-based rolled electrode, a rolled supercapacitor containing such an electrode, and a process for producing same.

BACKGROUND OF THE INVENTION

Electrochemical capacitors (ECs), also known as ultracapacitors or supercapacitors, are being considered for uses in hybrid electric vehicles (EVs) where they can supplement a battery used in an electric car to provide bursts of power needed for rapid acceleration, the biggest technical hurdle to making battery-powered cars commercially viable. A battery would still be used for cruising, but supercapacitors (with their ability to release energy much more quickly than batteries) would kick in whenever the car needs to accelerate for merging, passing, emergency maneuvers, and hill climbing. The EC must also store sufficient energy to provide an acceptable driving range. To be cost-, volume-, and weight-effective compared to additional battery capacity they must combine adequate energy densities (volumetric and gravimetric) and power densities (volumetric and gravimetric) with long cycle life, and meet cost targets as well.

ECs are also gaining acceptance in the electronics industry as system designers become familiar with their attributes and benefits. ECs were originally developed to provide large bursts of driving energy for orbital lasers. In complementary metal oxide semiconductor (CMOS) memory backup applications, for instance, a one-Farad EC having a volume of only one-half cubic inch can replace nickel-cadmium or lithium batteries and provide backup power for months. For a given applied voltage, the stored energy in an EC associated with a given charge is half that storable in a corresponding battery system for passage of the same charge. Nevertheless, ECs are extremely attractive power sources. Compared with batteries, they require no maintenance, offer much higher cycle-life, require a very simple charging circuit, experience no "memory effect," and are generally much safer. Physical rather than chemical energy storage is the key reason for their safe operation and extraordinarily high cycle-life. Perhaps most importantly, capacitors offer higher power density than batteries.

The high volumetric capacitance density of an EC relative to conventional capacitors (10 to 100 times greater than conventional capacitors) derives from using porous electrodes to create a large effective "plate area" and from storing energy in the diffuse double layer. This double layer, created naturally at a solid-electrolyte interface when voltage is imposed, has a thickness of only about 1 nm, thus forming an extremely small effective "plate separation." Such a supercapacitor is commonly referred to as an electric double layer capacitor (EDLC). The double layer capacitor is based on a high surface area electrode material, such as activated carbon, immersed in a liquid electrolyte. A polarized double layer is formed at electrode-electrolyte interfaces providing high capacitance. This implies that the specific capacitance of a supercapacitor is directly proportional to the specific surface area of the electrode material. This surface area must be accessible by electrolyte and the resulting interfacial zones must be sufficiently large to accommodate the so-called electric double-layer charges.

In some ECs, stored energy is further augmented by pseudo-capacitance effects, occurring again at the solid-electrolyte interface due to electrochemical phenomena such as the redox charge transfer. Such a supercapacitor is commonly referred to as a pseudo-capacitor or redox supercapacitor. A third type of supercapacitor is a lithium-ion capacitor that contains a pre-lithiated graphite anode, an EDLC cathode (e.g. typically based on activated carbon particles), and a lithium salt electrolyte.

However, there are several serious technical issues associated with current state-of-the-art supercapacitors:

(1) Experience with supercapacitors based on activated carbon electrodes shows that the experimentally measured capacitance is always much lower than the geometrical capacitance calculated from the measured surface area and the width of the dipole layer. For very high surface area activated carbons, typically only about 20-40 percent of the "theoretical" capacitance was observed. This disappointing performance is related to the presence of micro-pores (<2 nm, mostly <1 nm) and ascribed to inaccessibility of some pores by the electrolyte, wetting deficiencies, and/or the inability of a double layer to form successfully in pores in which the oppositely charged surfaces are less than about 1-2 nm apart. In activated carbons, depending on the source of the carbon and the heat treatment temperature, a surprising amount of surfaces can be in the form of such micro-pores that are not accessible to liquid electrolyte.

(2) Despite the high gravimetric capacitances at the electrode level (based on active material weights alone) as frequently claimed in open literature and patent documents, these electrodes unfortunately fail to provide energy storage devices with high capacities at the supercapacitor cell or pack level (based on the total cell weight or pack weight). This is due to the notion that, in these reports, the actual mass loadings of the electrodes and the apparent densities for the active materials are too low. In most cases, the active material mass loadings of the electrodes (areal density) is significantly lower than 10 mg/cm$^2$ (areal density=the amount of active materials per electrode cross-sectional area along the electrode thickness direction) and the apparent volume density or tap density of the active material is typically less than 0.75 g/cm$^{-3}$ (more typically less than 0.5 g/cm$^{-3}$ and most typically less than 0.3 g/cm$^{-3}$) even for relatively large particles of activated carbon.

The low mass loading is primarily due to the inability to obtain thicker electrodes (thicker than 150 μm) using the conventional slurry coating procedure. This is not a trivial task as one might think, and in reality the electrode thickness is not a design parameter that can be arbitrarily and freely varied for the purpose of optimizing the cell performance. Contrarily, thicker samples tend to become extremely brittle or of poor structural integrity and would also require the use of large amounts of binder resin. These problems are particularly acute for graphene material-based electrodes. It has not been previously possible to produce graphene-based electrodes that are thicker than 100 μm and remain highly porous with pores remaining fully accessible to liquid electrolyte. The low areal densities and low volume densities (related to thin electrodes and poor packing density) result in relatively low volumetric capacitances and low volumetric energy density of the supercapacitor cells.

With the growing demand for more compact and portable energy storage systems, there is keen interest to increase the utilization of the volume of the energy storage devices. Novel electrode materials and designs that enable high volumetric capacitances and high mass loadings are essential to achieving improved cell volumetric capacitances and energy densities.

(3) During the past decade, much work has been conducted to develop electrode materials with increased volumetric capacitances utilizing porous carbon-based materials, such as graphene, carbon nanotube-based composites, porous graphite oxide, and porous meso carbon. Although these experimental supercapacitors featuring such electrode materials can be charged and discharged at high rates and also exhibit large volumetric electrode capacitances (50 to 150 F/cm$^3$ in most cases, based on the electrode volume, not total cell volume), their typical active mass loading of <1 mg/cm$^2$, tap density of <0.2 g/cm$^{-3}$, and electrode thicknesses of up to tens of micrometers (≪100 μm) are still significantly lower than those used in most commercially available electrochemical capacitors (i.e. 10 mg/cm$^2$, 100-200 μm), which results in energy storage devices with relatively low areal and volumetric capacitances and low volumetric energy densities.

(4) For graphene-based supercapacitors, there are additional problems that remain to be solved. For instance, individual graphene sheets have a great tendency to re-stack themselves, effectively reducing the specific surface areas that are accessible by the electrolyte in a supercapacitor electrode and, hence, reducing the specific capacitance of the electrode. Further, the tap density of graphene-based electrode is extremely low, typically lower than 0.3 g/cm$^3$ and more typically lower than 0.1 g/cm$^3$. Furthermore, it has been very difficult to produce graphene-based electrodes that are thicker than 75 μm using the conventional slurry coating process. Such an electrode typically requires a large amount of a binder resin (hence, significantly reduced active material proportion vs. non-active or overhead materials/components). In addition, any graphene- or graphitic material-based electrode prepared in this manner that is thicker than 50 μm is brittle and weak. There has been no effective solution to these problems.

Thus, a need exists for an alternative carbon or graphitic material that can form a multi-layer structure having inter-layer pores of adequate sizes. These pores must be sufficiently large to allow for accessibility by the electrolyte and to enable the formation of electric double-layer charges, which presumably require a pore size of at least 1-2 nm. However, these pores or inter-layer spacings must also be sufficiently small to ensure a large tap density (hence, large capacitance per unit volume or large volumetric energy density). Unfortunately, the typical tap density of graphene-based and other graphitic material-based electrodes produced by the conventional process is less than 0.3 g/cm$^3$, and most typically ≪0.2 g/cm$^3$. To a great extent, the requirement to have large pore sizes and high porosity level and the requirement to have a high tap density are considered mutually exclusive in supercapacitors.

Therefore, there is clear and urgent need for supercapacitors that have high active material mass loading (high areal density), active materials with a high apparent density (high tap density), high electrode thickness, high volumetric capacitance, and high volumetric energy density. One must also overcome problems such as the demand for large proportion of a binder resin, and difficulty in producing thick electrode layers.

Thus, it is an object of the present invention to provide a cost-effective process for mass-producing highly conductive, mechanically robust non-graphene-based graphitic electrodes that do not have these common issues of conventional graphene-based electrodes or activated carbon electrodes. This process must also enable the flexible design and control of the porosity level and pore sizes. Specifically, this process enables the production of electrodes that overcome the issues of low tap density, low achievable electrode thickness, low achievable active material mass loading, low specific capacitance (per unit weight or volume), and low gravimetric and volumetric energy densities.

SUMMARY OF THE INVENTION

The present invention provides a rolled supercapacitor and a production process that meet all of the above requirements. The rolled supercapacitor comprises an anode, a cathode, a porous separator electronically separating the anode and the cathode, and an electrolyte in ionic contact with the anode and the cathode, wherein the anode contains a wound anode roll of an anode active material having an anode roll length, an anode roll width, and an anode roll thickness and wherein the anode active material contains graphite flakes of exfoliated graphite (graphite worms) or expanded graphite that are oriented substantially parallel to the plane defined by the anode roll length and the anode roll width; and/or the cathode contains a wound cathode roll of a cathode active material having a cathode roll length, a cathode roll width, and a cathode roll thickness and the cathode active material contains flakes of graphite worms or expanded graphite that are oriented substantially parallel to the plane defined by the cathode roll length and the cathode roll width; and wherein the anode roll width and/or the cathode roll width is substantially perpendicular to the separator plane.

Exfoliated graphite or graphite worms are prepared by thermal exfoliation of a graphite intercalation compound (GIC) or graphite oxide. A graphite worm is typically composed of multiple exfoliated flakes that remain interconnected. There are gaps or pores between these constituent flakes. The interconnections between these constituent flakes of graphite worms may be broken to produce flakes of "expanded graphite" by using mechanical shearing, air jet milling, ultrasonication, etc.

In certain embodiments, the flakes of exfoliated graphite worms or expanded graphite are physically or chemically activated flakes that exhibit a high specific surface area (typically from 500 to 3,300 m$^2$/g, after activation).

To form a pseudo-capacitor, the activated or non-activated flakes of graphite worms or expanded graphite may be attached to or coupled with a nanoscaled coating or particles of a redox pair partner selected from an intrinsically conductive polymer, a transition metal oxide, and/or an organic molecule, wherein the redox pair partner and said graphene sheets form a redox pair for pseudo-capacitance. The intrinsically conducting polymer may be selected from polyaniline, polypyrrole, polythiophene, polyfuran, sulfonated polyaniline, sulfonated polypyrrole, sulfonated polythiophene, sulfonated polyfuran, sulfonated polyacetylene, or a combination thereof.

The liquid or gel electrolyte typically contains an aqueous electrolyte, an organic electrolyte, an ionic liquid electrolyte, or a mixture of an organic and an ionic electrolyte. There is no particular limitation on the type of electrolyte that can be used. Any electrolyte used in prior art supercapacitors can be implemented for use in the instant rolled supercapacitor.

Typically, the rolled supercapacitor further contains an anode tab connected to or integral with the anode and a cathode tab connected to or integral with the cathode. Preferably and typically, the rolled supercapacitor further comprises a casing that encloses the anode, the cathode, the separator, and the electrolyte therein to form a sealed supercapacitor.

In certain embodiments, in the rolled supercapacitor (herein referred to as Type-I rolled supercapacitor), the wound anode roll of an anode active material contains (a) a layer of supporting solid substrate having two primary surfaces wherein either one or both of the primary surfaces are coated with the anode active material, an optional conductive additive, and an optional binder or (b) a layer of supporting porous substrate having pores that are impregnated with the anode active material, an optional conductive additive, and an optional binder. In certain embodiments, the wound cathode roll of a cathode active material contains (A) a layer of supporting solid substrate having two primary surfaces wherein either one or both of the primary surfaces are coated with the cathode active material, an optional conductive additive, and an optional binder or (B) a layer of supporting porous substrate having pores that are impregnated with the cathode active material, an optional conductive additive, and an optional binder.

In certain preferred embodiments, the electrolyte and the flakes of graphite worms or expanded graphite in the anode or the cathode of the invented rolled supercapacitor are assembled into an electrolyte-impregnated laminar graphite structure that is directly wound into an anode roll or a cathode roll (without using a current collector or supporting layer inside the roll), wherein the flakes of graphite worms or expanded graphite are alternately spaced by thin electrolyte layers, having a thickness from 0.4 nm to 10 nm, and the laminar graphite structure has a physical density from 0.5 to 1.7 $g/cm^3$ and a specific surface area from 50 to 3,300 $m^2/g$, when measured in a dried state of the laminar structure without the electrolyte. Any current collector or supporting layer is outside the roll in this Type-II supercapacitor.

Thus, a particularly desirable embodiment of the present invention is a rolled supercapacitor (Type-II rolled supercapacitor) comprising an anode current collector, an anode supported by the anode current collector, a cathode, a cathode current collector supporting the cathode, an ion-permeable separator that electronically separates the anode and the cathode, and an electrolyte in ionic contact with the anode and the cathode, wherein the anode and/or the cathode contains a wound roll of an electrolyte-impregnated laminar graphite structure, which is composed of multiple flakes of graphite worms or expanded graphite being alternately spaced by thin electrolyte layers, less than 5 nm in thickness (typically from 0.3 nm to 5 nm), and the multiple flakes of graphite worms or expanded graphite are substantially aligned along a desired direction perpendicular to the separator, and wherein the laminar graphite structure has a physical density from 0.5 to 1.7 $g/cm^3$ and a specific surface area from 50 to 3,300 $m^2/g$, when measured in a dried state of the laminar graphite structure without the electrolyte.

The invention also provides an electrode roll (or rolled electrode) for use in an anode or a cathode of a supercapacitor. The electrode roll (an anode roll or cathode roll) has a roll length, roll width, and roll thickness and contains an electrolyte-impregnated laminar graphite structure, which is composed of multiple graphite flakes of graphite worms or expanded graphite being alternately spaced by thin electrolyte layers, from 0.3 nm to 10 nm in thickness, wherein multiple flakes of graphite worms or expanded graphite are substantially aligned along a desired direction parallel to the roll length and the roll width and perpendicular to the roll thickness, and wherein the laminar graphite structure has a physical density from 0.5 to 1.7 $g/cm^3$ and a specific surface area from 50 to 3,300 $m^2/g$, when measured in a dried state of the laminar graphite structure without the presence of the electrolyte.

The rolled supercapacitor (either Type-I or Type-II) may be an electric double layer capacitor (EDLC), a pseudo or redox supercapacitor, a lithium-ion capacitor (LIC), or a sodium-ion capacitor. In one example, the supercapacitor is a lithium-ion capacitor or sodium-ion capacitor, wherein the cathode contains a wound cathode roll of a cathode active material having flakes of graphite worms or expanded graphite that are oriented substantially parallel to the plane defined by the cathode roll length and the cathode roll width; and the anode contains a pre-lithiated anode active material or a pre-sodiated anode active material. Preferably, the anode contains a roll of a layer or two layers of a pre-lithiated anode active material or pre-sodiated anode active material layer coated on a solid or porous supporting substrate.

In certain embodiments, the rolled supercapacitor is a lithium-ion capacitor or sodium-ion capacitor, wherein the cathode contains a wound cathode roll of a cathode active material having flakes of graphite worms or expanded graphite that are oriented substantially parallel to the plane defined by the cathode roll length and the cathode roll width; and the anode contains a pre-lithiated anode active material or a pre-sodiated anode active material. Preferably, the anode contains a roll of a layer or two layers of a pre-lithiated anode active material or pre-sodiated anode active material layer coated on a solid or porous supporting substrate.

Additionally, the invention provides a supercapacitor that contains a plurality of the presently invented rolled supercapacitors that are internally connected in series. The invention also provides a supercapacitor that contains a plurality of the presently invented rolled supercapacitors that are internally connected in parallel.

The invention also provides a process for producing a Type-I rolled supercapacitor. The process comprises:
(a) preparing an anode roll by rolling or winding a layer of solid or porous supporting substrate coated or impregnated with an anode active material, an optional conductive additive, and an optional binder into a roll shape;
(b) preparing a cathode roll by rolling or winding a layer of solid or porous supporting substrate coated or impregnated with a cathode active material, an optional conductive additive, and an optional binder into a roll shape; wherein at least the anode roll or the cathode roll contains flakes of graphite worms or expanded graphite that are oriented perpendicular to the anode roll thickness or cathode roll thickness;
(c) aligning and packing the anode roll, the cathode roll, and an ion-conducting separator layer between the anode roll and the cathode roll to form a supercapacitor assembly in such a manner that the anode roll width and/or the cathode roll width direction is substantially perpendicular to the separator plane; and
(d) impregnating an electrolyte into the battery assembly before or after the supercapacitor assembly is inserted into a protective casing to form the rolled supercapacitor.

Another embodiment of the instant invention is a process for producing the rolled supercapacitor (e.g. a lithium-ion capacitor or sodium-ion capacitor). The process comprises: (a) preparing an anode containing an anode active material, an optional conductive additive, and an optional binder (not necessarily in a roll shape); (b) preparing a cathode roll by rolling or winding a layer of solid or porous supporting substrate coated or impregnated with a cathode active material, an optional conductive additive, and an optional binder into a roll shape, wherein the cathode active material contains flakes of graphite worms or expanded graphite that are oriented substantially parallel to the plane defined by the cathode roll length and the cathode roll width (the layer or roll has a length and a width that together define a plane); (c) aligning and packing the anode, the cathode roll, and an ion-conducting separator layer between the anode and the cathode roll to form a supercapacitor assembly in such a manner that the cathode roll width direction is substantially perpendicular to the separator plane; and (d) impregnating an electrolyte into the supercapacitor assembly before or after the supercapacitor assembly is inserted into a protective casing to form the rolled supercapacitor.

Preferably, the porous supporting substrate contains an electrically conductive porous layer selected from metal foam, metal web or screen, perforated metal sheet-based structure, metal fiber mat, metal nanowire mat, conductive polymer nanofiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, or a combination thereof Another preferred embodiment is a process for producing the Type-II rolled supercapacitor. The process comprises: (a) preparing an anode roll by winding a layer of electrolyte-impregnated laminar graphite structure into a roll shape having an anode roll length, anode roll width, and anode roll thickness, wherein the electrolyte-impregnated laminar graphite structure is composed of multiple graphene sheets being alternately spaced by thin electrolyte layers, from 0.3 nm to 10 nm in thickness, wherein the multiple graphene sheets are substantially aligned along a desired direction parallel to the anode roll length and anode roll width and perpendicular to the anode roll thickness, and wherein the laminar graphite structure has a physical density from 0.5 to 1.7 g/cm$^3$ and a specific surface area from 50 to 3,300 m$^2$/g, when measured in a dried state of the laminar graphite structure without the presence of the electrolyte; (b) preparing a cathode roll by winding a layer of electrolyte-impregnated laminar graphite structure into a roll shape having a cathode roll length, cathode roll width, and cathode roll thickness, wherein the electrolyte-impregnated laminar graphite structure is composed of multiple flakes of graphite worms or expanded graphite being alternately spaced by thin electrolyte layers, from 0.3 nm to 10 nm in thickness, wherein the multiple flakes of graphite worms or expanded graphite are substantially aligned along a desired direction parallel to the cathode roll length and cathode roll width and perpendicular to said cathode roll thickness; (c) aligning the anode roll, the cathode roll, and an ion-conducting separator between the anode roll and the cathode roll together to form a supercapacitor assembly in such a manner that the anode roll width and/or the cathode roll width direction is substantially perpendicular to the separator plane; and (d) sealing the supercapacitor assembly in a protective casing to form the rolled supercapacitor.

In the above process, the layer of electrolyte-impregnated laminar graphite structure in the anode roll or the cathode roll may be prepared by a procedure comprising: (i) preparing a graphite dispersion having multiple flakes of graphite worms or expanded graphite dispersed in a liquid or gel electrolyte; (ii) subjecting the graphite dispersion to a forced assembly procedure, forcing the multiple flakes of graphite worms or expanded graphite and the electrolyte to assemble into a layer of the electrolyte-impregnated laminar graphite structure having a layer plane and a layer thickness, wherein the multiple flakes of graphite worms or expanded graphite are alternately spaced by thin electrolyte layers, having a thickness from 0.4 nm to 10 nm, and the multiple flakes of graphite worms or expanded graphite are substantially aligned along a desired direction parallel to the layer plane and perpendicular to the layer thickness direction, and wherein the laminar graphite structure has a physical density from 0.5 to 1.7 g/cm$^3$ and a specific surface area from 50 to 3,300 m$^2$/g, when measured in a dried state of the laminar structure without the presence of the electrolyte; and (iii) winding the layer of the electrolyte-impregnated laminar graphite structure into a roll shape.

The forced assembly procedure preferably includes introducing a first layer of graphite dispersion onto a surface of a supporting conveyor and driving the layer of graphite suspension supported on the conveyor through at least a pair of pressing rollers to reduce a thickness of the graphite dispersion layer and align the multiple flakes of graphite worms or expanded graphite along a direction parallel to the conveyor surface for forming a layer of electrolyte-impregnated laminar graphite structure.

The process preferably further includes a step of introducing a second layer of graphite dispersion onto a surface of the layer of electrolyte-impregnated laminar graphite structure to form a two layer laminar structure, and driving the two-layer laminar structure through at least a pair of pressing rollers to reduce a thickness of the second layer of graphite dispersion and align the multiple flakes of graphite worms or expanded graphite along a direction parallel to the conveyor surface for forming a layer of electrolyte-impregnated laminar graphite structure. The same procedure may be repeated by allowing the conveyor to move toward a third set of pressing rollers, depositing additional (third) layer of graphite dispersion onto the two-layer structure, and forcing the resulting 3-layer structure to go through the gap between the two rollers in the third set to form a further compacted, electrolyte-impregnated laminar graphite structure.

The process may further include a step of compressing or roll-pressing the electrolyte-impregnated laminar structure to reduce the electrolyte layer thickness in the impregnated laminar structure, improve orientation of the flakes of graphite worms or expanded graphite, and squeeze excess electrolyte out of the impregnated laminar graphite structure for forming the supercapacitor electrode.

The process is preferably a roll-to-roll (reel-to-reel) process wherein the forced assembly procedure includes feeding the supporting conveyor, in a continuous film form, from a feeder roller to a deposition zone, continuously or intermittently depositing the graphite dispersion onto a surface of the supporting conveyor film to form the layer of graphite dispersion thereon, and collecting the layer of electrolyte-impregnated laminar graphite structure, supported on conveyor film, on a collector roller.

The process may further comprise a step of cutting or slitting the electrolyte-impregnated laminar graphite structure into multiple sheets of desired dimensions prior to being wound into multiple rolls.

The process may further comprise a step of attaching the electrolyte-impregnated laminar graphite structure to a current collector, wherein the flakes of graphite worms or expanded graphite are aligned parallel to a primary surface of the current collector.

DESCRIPTION OF THE PREFERRED EMBODIMENTS

Figure 2A:
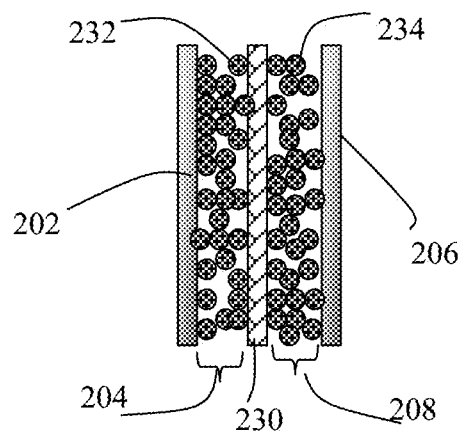
FIG. 2(A) Schematic of a conventional activated carbon-based supercapacitor cell.

As schematically illustrated in FIG. 2(A), a prior art supercapacitor cell is typically composed of an anode current collector 202 (e.g. Al foil 12-15 μm thick), an anode active material layer 204 (containing an anode active material, such as activated carbon particles 232 and conductive additives that are bonded by a resin binder, such as PVDF), a porous separator 230, a cathode active material layer 208 (containing a cathode active material, such as activated carbon particles 234, and conductive additives that are all bonded by a resin binder, not shown), a cathode current collector 206 (e.g. Al foil), and a liquid electrolyte disposed in both the anode active material layer 204 (also simply referred to as the "anode layer") and the cathode active material layer 208 (or simply "cathode layer"). The entire cell is encased in a protective housing, such as a thin plastic-aluminum foil laminate-based envelop. The prior art supercapacitor cell is typically made by a process that includes the following steps:

a) The first step is mixing particles of the anode active material (e.g. activated carbon), a conductive filler (e.g. graphite flakes), a resin binder (e.g. PVDF) in a solvent (e.g. NMP) to form an anode slurry. On a separate basis, particles of the cathode active material (e.g. activated carbon), a conductive filler (e.g. acetylene black), a resin binder (e.g. PVDF) are mixed and dispersed in a solvent (e.g. NMP) to form a cathode slurry.

b) The second step includes coating the anode slurry onto one or both primary surfaces of an anode current collector (e.g. Cu or Al foil), drying the coated layer by vaporizing the solvent (e.g. NMP) to form a dried anode electrode coated on Cu or Al foil. Similarly, the cathode slurry is coated and dried to form a dried cathode electrode coated on Al foil.

c) The third step includes laminating an anode/Al foil sheet, a porous separator layer, and a cathode/Al foil sheet together to form a 3-layer or 5-layer assembly, which is cut and slit into desired sizes and stacked to form a rectangular structure (as an example of shape) or rolled into a cylindrical cell structure.

d) The rectangular or cylindrical laminated structure is then encased in a laminated aluminum-plastic envelope or steel casing.

e) A liquid electrolyte is then injected into the laminated housing structure to make a supercapacitor cell.

There are several serious problems associated with this conventional process and the resulting supercapacitor cell:

1) It is very difficult to produce an electrode layer (anode layer or cathode layer) that is thicker than 100 μm and practically impossible or impractical to produce an electrode layer thicker than 200 μm. There are several reasons why this is the case. An electrode of 100 μm thickness typically requires a heating zone of at least 30-50 meters long in a slurry coating facility, which is too time consuming, too energy intensive, and not cost-effective. A heating zone longer than 100 meters is not unusual.

2) For some electrode active materials, such as graphene sheets, it has not been possible to produce an electrode thicker than 50 μm in a real manufacturing environment on a continuous basis. This is despite the notion that some thicker electrodes have been claimed in open or patent literature, which were prepared in a laboratory on a small scale. In a laboratory setting, presumably one could repeatedly add new materials to a layer and manually consolidate the layer to increase the thickness of an electrode. However, even with such a procedure, the resulting electrode becomes very fragile and brittle. This is even worse for graphene-based electrodes, since repeated compressions lead to re-stacking of graphene sheets and, hence, significantly reduced specific surface area and reduced specific capacitance.

3) With a conventional supercapacitor, as depicted in FIG. 2(A), the actual mass loadings of the electrodes and the apparent densities for the active materials are too low. In most cases, the active material mass loadings of the electrodes (areal density) is significantly lower than 10 mg/cm$^2$ and the apparent volume density or tap density of the active material is typically less than 0.75 g/cm$^3$ (more typically less than 0.5 g/cm$^3$ and most typically less than 0.3 g/cm$^3$) even for relatively large particles of activated carbon. In addition, there are so many other non-active materials (e.g. conductive additive and resin binder) that add additional weights and volumes to the electrode without contributing to the cell capacity. These low areal densities and low volume densities result in relatively low volumetric capacitances and low volumetric energy density.

4) The conventional process requires dispersing electrode active materials (anode active material and cathode active material) in a liquid solvent (e.g. NMP) to make a wet slurry and, upon coating on a current collector surface, the liquid solvent has to be removed to dry the electrode layer. Once the anode and cathode layers, along with a separator layer, are laminated together and packaged in a housing to make a supercapacitor cell, one then injects a liquid electrolyte into the cell. In actuality, one makes the two electrodes wet, then makes the electrodes dry, and finally makes them wet again. Such a wet-dry-wet process is clearly not a good process at all.

5) Current supercapacitors (e.g. symmetric supercapacitors or electric double layer capacitors, EDLC) still suffer from a relatively low gravimetric energy density and low volumetric energy density. Commercially available EDLCs exhibit a gravimetric energy density of approximately 6 Wh/kg and no experimental EDLC cells have been reported to exhibit a cell-level energy density higher than 10 Wh/kg (based on the total cell weight) at room temperature. Although experimental supercapacitors can exhibit large volumetric electrode capacitances (50 to 100 F/cm$^3$ in most cases) at the electrode level, their typical active mass loading of <1 mg/cm$^2$, tap density of <0.1 g/cm$^3$ and electrode thicknesses of up to tens of micrometers in these experimental cells remain significantly lower than those used in most commercially available electrochemical capacitors, resulting in energy storage devices with relatively low areal and volumetric capacities and low volumetric energy densities based on the cell (device) weight.

In literature, the energy density data reported based on either the active material weight alone or electrode weight cannot directly translate into the energy densities of a practical supercapacitor cell or device. The "overhead weight" or weights of other device components (binder, conductive additive, current collectors, separator, electrolyte, and packaging) must also be taken into account. The convention production process results in an active material proportion being less than 30% by weight of the total cell weight (<15% in some cases; e.g. for graphene-based active material).

Figure 2B:
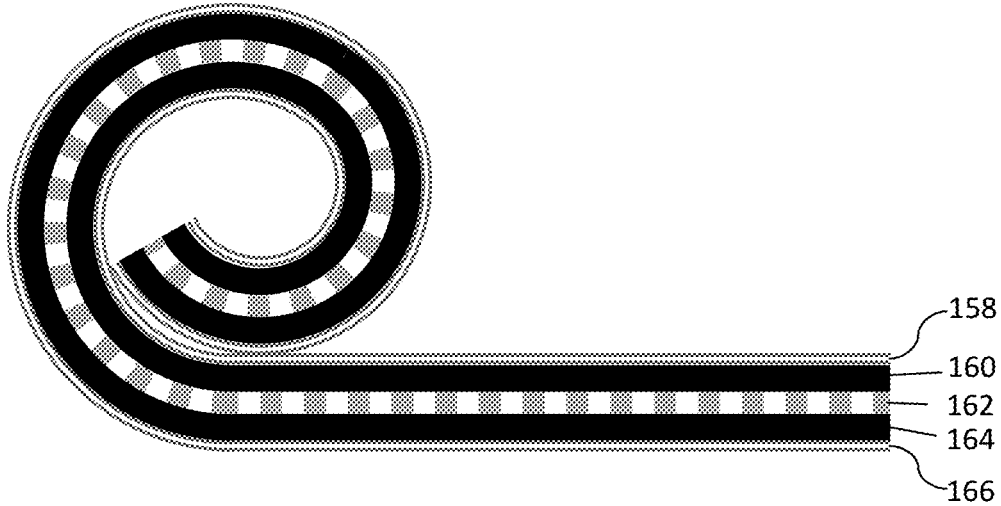
FIG. 2(B) Schematic of part of an internal structure of a prior art cylindrical supercapacitor cell, indicating that each roll is a unit cell containing a laminated structure of an anode layer coated on an anode current collector, a porous separator, and a cathode layer coated on a cathode current collector, which is wound to form a cylindrical roll.

Schematically shown in FIG. 2(B) is part of an internal structure of a prior art cylindrical supercapacitor cell, indicating that each cell contains a roll, which is composed of a laminate of an anode layer 110 coated on an anode current collector 108 (there can be two anode active layers coated on two primary surfaces of an anode current collector), a porous separator 112, and a cathode layer 114 coated on a cathode current collector 116 (there can be two cathode active layers coated on two primary surfaces of a cathode current collector). Each roll contains both the anode and the cathode active material layers therein separated by a porous separator. There is only one roll in one unit cell.

Figure 2C:
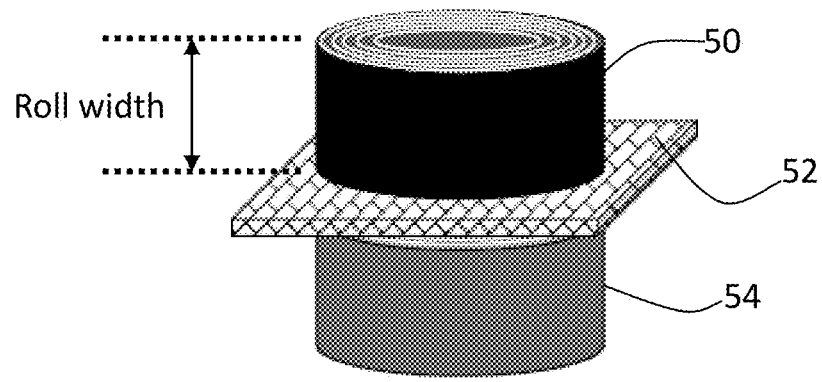
FIG. 2(C) Schematic drawing of a presently invented rolled supercapacitor cell, wherein each cell contains an anode roll, a cathode roll, and a porous separator disposed between the two rolls, touching one end surface of each roll.
Figure 2D:
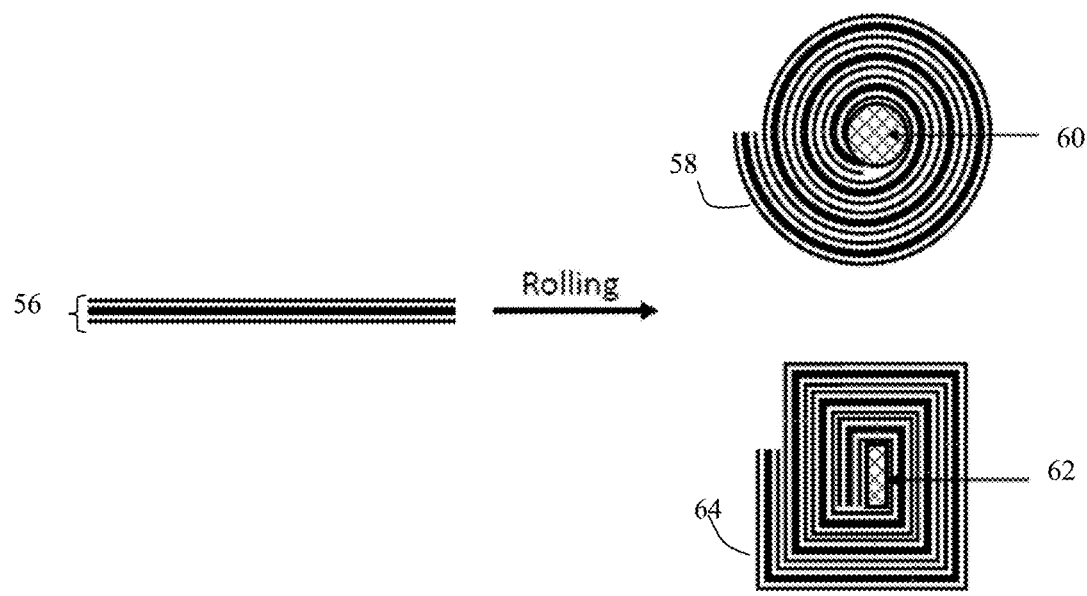
FIG. 2(D) Schematic drawing of a process for winding an anode or cathode active material-coated solid substrate around a mandrel (60 or 62) to form a cylindrical roll 58 or cuboidal roll 54.

In contrast, in the presently invented rolled supercapacitor (FIG. 2(C)), one unit cell contains at least two separate rolls: a cathode roll 50 and an anode roll 54, which are separated by a porous membrane (or ion-conducting separator layer) 52. As schematically shown in FIG. 2(D), the anode roll may be formed by winding an anode active material-coated film or layer 56 around a mandrel with a desired cross-section shape, such as a circle 60 or a rectangle 62, to form a cylinder roll 58 or cuboid roll 64, respectively. The anode active material-coated film or layer may be an anode active material layer-coated Al foil produced by the conventional slurry coating process. The anode active material layer may contain a conductive additive and a resin binder. The coated film or layer may be slit/cut into a desired width (which becomes the roll width after the coated film/layer is wound into a roll). The coated layer is then rolled or wound into an anode roll of a desired shape. The cathode roll may be produced in a similar manner. One anode roll, one sheet of porous separator, and one cathode roll may be assembled together to form one rolled battery cell, as illustrated in FIG. 2(C), wherein the roll width is perpendicular to the separator plane.

By arranging the roll layer width normal to the separator, the pore channels originally parallel to the current collector can be aligned to facilitate the ionic conduction in the electrode layers. The present invention provides a rolled supercapacitor cell having a high roll width (corresponding to the thickness of a conventional electrode) and, thus, a high active material mass loading. The cell also has a low overhead weight and volume, high volumetric capacitance, and high volumetric energy density. In addition, the manufacturing costs of the presently invented rolled supercapacitor produced by the presently invented process can be significantly lower than those by conventional processes.

The present invention provides a rolled supercapacitor cell having a high electrode layer (roll) width (no theoretical limitation on the electrode roll width that can be made by using the presently invented process), high active material mass loading (and high overall electrode mass and volume), low overhead weight and volume, high volumetric capacitance, and high volumetric energy density.

The invented rolled supercapacitor comprises an anode, a cathode, a porous separator electronically separating the anode and the cathode, and an electrolyte in ionic contact with the anode and the cathode, wherein the anode contains a wound anode roll of an anode active material having an anode roll length, an anode roll width, and an anode roll thickness, wherein the anode active material contains flakes of graphite worms or expanded graphite that are oriented substantially parallel to the plane defined by the anode roll length and the anode roll width; and/or the cathode contains a wound cathode roll of a cathode active material having a cathode roll length, a cathode roll width, and a cathode roll thickness, wherein the cathode active material contains flakes of graphite worms or expanded graphite that are oriented substantially parallel to the plane defined by the cathode roll length and the cathode roll width; and wherein the anode roll width and/or the cathode roll width is substantially perpendicular to the separator plane. The preferred orientation of flakes of graphite worms or expanded graphite, being normal to the separator plane, is found to be conducive to fast responses of massive charges and, thus, high power density of the resulting supercapacitor.

Typically, the rolled supercapacitor further contains an anode tab connected to or integral with the anode and a cathode tab connected to or integral with the cathode. Preferably and typically, the rolled supercapacitor further comprises a casing that encloses the anode, the cathode, the separator, and the electrolyte therein to form a sealed supercapacitor.

In some cases (herein referred to as Type-II rolled supercapacitor for convenience), the anode roll or the cathode roll may contain electrode active material (i.e. oriented flakes of graphite worms or expanded graphite) that are present alone (along with an electrolyte) without being supported on a solid or porous supporting substrate inside a roll. In other cases (Type-I), the oriented graphene sheets are coated onto a solid substrate or impregnated into pores of a porous substrate, possibly along with some optional conductive additive and optional binder resin.

In these latter rolled supercapacitors (Type-I), the wound anode roll of an anode active material contains (a) a layer of supporting solid substrate having two primary surfaces wherein either one or both of the primary surfaces are coated with the anode active material, an optional conductive additive, and an optional binder or (b) a layer of supporting porous substrate having pores that are impregnated with the anode active material, an optional conductive additive, and an optional binder. In certain embodiments, the wound cathode roll of a cathode active material may contain (a) a layer of supporting solid substrate having two primary surfaces wherein either one or both of the primary surfaces are coated with the cathode active material, an optional conductive additive, and an optional binder or (b) a layer of supporting porous substrate having pores that are impregnated with the cathode active material, an optional conductive additive, and an optional binder.

In the former cases (Type-II), the electrolyte and the flakes of graphite worms or expanded graphite in the anode or the cathode of the invented rolled supercapacitor are assembled into an electrolyte-impregnated laminar graphite structure that is wound into an anode roll or a cathode roll, wherein the isolated flakes of graphite worms or expanded graphite are alternately spaced by thin electrolyte layers, (electrolyte layer) having a thickness from 0.3 nm to 10 nm, and the laminar graphene structure has a physical density from 0.5 to 1.7 g/cm$^3$ and a specific surface area from 50 to 3,300 m$^2$/g, when measured in a dried state of the laminar structure without the presence of the electrolyte. In these cases, the electrode produced has been pre-impregnated with an electrolyte (aqueous, organic, ionic liquid, or polymer gel), wherein all graphite flake surfaces have been wetted with a thin layer of electrolyte (hence, no dry spots) and all graphite flakes have been well-aligned along one direction and closely packed together. The graphite flakes are alternatingly spaced with ultra-thin layers of electrolyte (0.3 nm to <10 nm, more typically <5 nm, most typically <2 nm). The process obviates the need to go through the lengthy and environmentally unfriendly wet-dry-wet procedures of the prior art process.

A particularly desirable embodiment of the present invention is a rolled supercapacitor (Type-II) comprising an anode current collector, an anode, a cathode, a cathode current collector, an ion-permeable separator that electronically separates the anode and the cathode, and an electrolyte in ionic contact with the anode and the cathode, wherein the anode and/or the cathode contains a wound roll of an electrolyte-impregnated laminar graphite structure, which is composed of multiple flakes of graphite worms or expanded graphite being alternately spaced by thin electrolyte layers, less than 5 nm in thickness (typically from 0.3 nm to 5 nm), and the multiple graphite flakes are substantially aligned along a desired direction perpendicular to the separator, and wherein the laminar graphite structure has a physical density from 0.5 to 1.7 g/cm$^3$ and a specific surface area from 50 to 3,300 m$^2$/g, when measured in a dried state of the laminar graphite structure without the electrolyte.

Figure 2E:
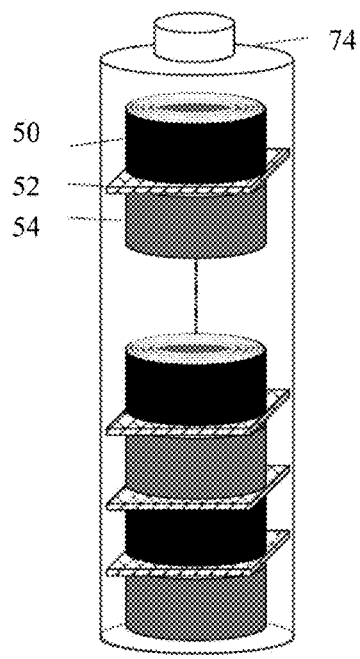
FIG. 2(E) Schematic of a presently invented supercapacitor containing multiple rolled cells internally connected in series.

As shown in FIG. 2(C), one anode roll and one cathode roll, separated by a porous separator, are assembled to form a unit cell. As illustrated in FIG. 2(E), multiple unit cells (each containing an anode roll 50, a separator 52, and a cathode roll 54) may be internally connected in series and sealed inside a casing 74 (e.g. a cylindrical stainless steel housing) to form a supercapacitor of a multiplied or significantly higher output voltage level. For instance, unit cell 1 having a voltage $V_1$, unit cell 2 having a voltage $V_2$, etc. (up to unit cell n having a voltage $V_n$) may be internally connected to form an output voltage $V=V_1+V_2+ \ldots +V_n$. If $V_1=V_2=V_3= \ldots =V_n$, then the overall output voltage is $V_n$=n $V_1$. Assume one unit battery cell has an output voltage of 3.0 volts, then one cylinder containing 6 unit cells connected in series will provide a battery output voltage of 18 volts. There is nothing in supercapacitor industry that a cylindrical supercapacitor can deliver a battery voltage higher than 4.5 volts. Further, the instant invention enables design and construction of a supercapacitor that can have essentially any output voltage. These are some additional surprising and useful features of the presently invented rolled supercapacitors.

Figure 2F:
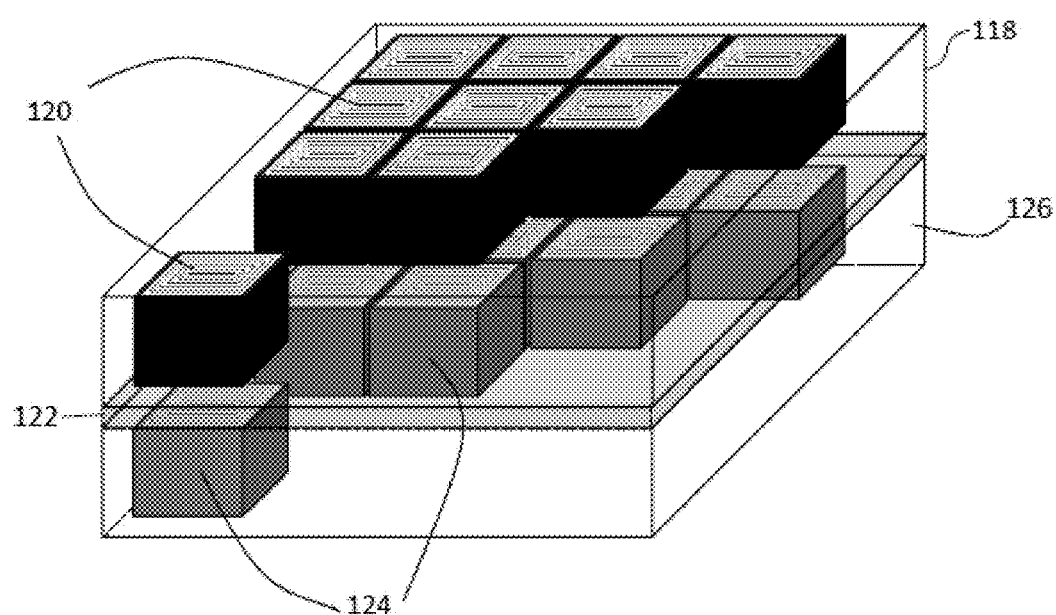
FIG. 2(F) Schematic of a presently invented supercapacitor containing multiple rolled cells internally connected in parallel.

Alternatively, multiple unit cells may be internally connected in parallel to form a supercapacitor that can deliver massive power and energy. A preferred and unique configuration of such a supercapacitor is illustrated in FIG. 2(F), wherein multiple cathode rolls 124 being parallel to each other are packed together to form approximately first half 126 of the massive-power supercapacitor. A corresponding pack of multiple anode rolls 120 are also arranged to be parallel to one another to form approximately the other half 118 of the supercapacitor. The two packs are then combined together, but separated by a porous separator 122, to form a complete supercapacitor. There is no theoretical limitation on the number of anode rolls or cathode rolls in such a supercapacitor. The output voltage is typically the same as the output voltage of the constituent cells (provided these unit cells are identical in composition and structure). However, the output current can be massive since there are large amounts of active materials contained in such a supercapacitor. It may be noted that the anode rolls or the cathode rolls can assume any cross-sectional shape (e.g. circular, square, rectangle, etc.) even though a square shape is shown in FIG. 2(F).

The process for producing a Type-I rolled supercapacitor may include some initial procedures commonly used to make conventional supercapacitors, followed by additional steps to create the rolled electrodes. The first step is mixing isolated graphite flakes, an optional conductive filler (e.g. graphite flakes), a resin binder (e.g. PVDF) in a solvent (e.g. NMP) to form an anode slurry. On a separate basis, isolated graphite flakes, an optional conductive filler (e.g. acetylene black), a resin binder (e.g. PVDF) are mixed and dispersed in a solvent (e.g. NMP) to form a cathode slurry.

The second step includes coating the anode slurry onto one or both primary surfaces of an anode current collector (e.g. Al foil or Ni foam), drying the coated layer by vaporizing the solvent (e.g. NMP) to form a dried anode electrode coated on Al foil or Ni foam to form a two-layer or three-layer anode layer structure. The anode layer structure is then wound into a roll shape to form an anode roll. Similarly, the cathode slurry is coated and dried to form a dried cathode electrode coated on Al foil or Ni foam. The resulting two-layer or three-layer cathode layer structure is then wound into a roll shape to form a cathode roll. The rolls may be cut and slit into desired sizes and shapes as desired.

The third step includes assembling an anode roll, a porous separator layer, and a cathode roll to form a supercapacitor assembly, which is then encased in a laminated aluminum-plastic envelope or steel casing. A liquid electrolyte is then injected into the laminated housing structure, which is then sealed to make a rolled supercapacitor cell. In this new supercapacitor configuration, the flakes of graphite worms or expanded graphite are aligned to be perpendicular to the separator layer. In contrast, the flakes of graphite worms or expanded graphite in a conventional supercapacitor cell are aligned parallel to the current collector plane and parallel to the separator layer plane.

Alternatively, for the production of a Type-II rolled supercapacitor, the process begins with the production of an electrolyte-impregnated laminar graphite structure, which is then wound into a roll shape for use as a supercapacitor electrode. In a preferred embodiment, the process comprises: (a) preparing a graphite dispersion having multiple flakes of graphite worms or expanded graphite dispersed in a liquid or gel electrolyte; and (b) subjecting the graphite dispersion to a forced assembly procedure, forcing the multiple graphite flakes to assemble into the electrolyte-impregnated laminar graphite structure, wherein the multiple flakes of graphite worms or expanded graphite are alternately spaced by thin electrolyte layers, less than 10 nm (preferably <5 nm) in thickness, and the multiple flakes of graphite worms or expanded graphite are substantially aligned along a desired direction, and wherein the laminar graphite structure has a physical density from 0.5 to 1.7 g/cm$^3$ (more typically 0.7-1.3 g/cm$^3$) and a specific surface area from 50 to 3,300 m$^2$/g (50 to 500 m$^2$/g, if the graphite flakes are not chemically activated), when measured in a dried state of the laminar structure without the electrolyte.

In some desired embodiments, the forced assembly procedure includes preparing a graphite dispersion, which contains flakes of graphite worms or expanded graphite well-dispersed in a liquid or gel electrolyte. In this dispersion, practically each and every graphite flake is surrounded by electrolyte species that are physically adsorbed to or chemically bonded to the graphite flake surface. During the subsequent consolidating and aligning operation, isolated flakes of graphite worms or expanded graphite remain separated from one another through electrolyte (electrolyte serving as a spacer that prevents contacting and re-stacking of graphite flakes). Upon removal of the excess electrolyte, graphite flakes remain spaced apart by electrolyte and this electrolyte-filled space can be as small as 0.3 nm (typically 0.3 nm to 2 nm, but can be larger). Contrary to the prior art teaching that the pores in activated carbon particles or between graphene sheets must be at least 2 nm in order to allow for entry of liquid electrolyte and the formation of electric double layers of charges in the electrolyte phase (but near the electrolyte-solid interface), we have discovered that the electrolyte spacer as small as 0.3 nm is capable of storing charges and there is no longer any electrolyte entry issue since the graphite flakes have been pre-wetted with electrolyte. In other words, since the electrolyte has been pre-loaded into the spaces between graphite flakes, there is no electrolyte inaccessibility issue in the presently invented supercapacitor. The present invention has essentially overcome all the significant, longstanding shortcomings of using graphene as a supercapacitor electrode active material.

Figure 3:
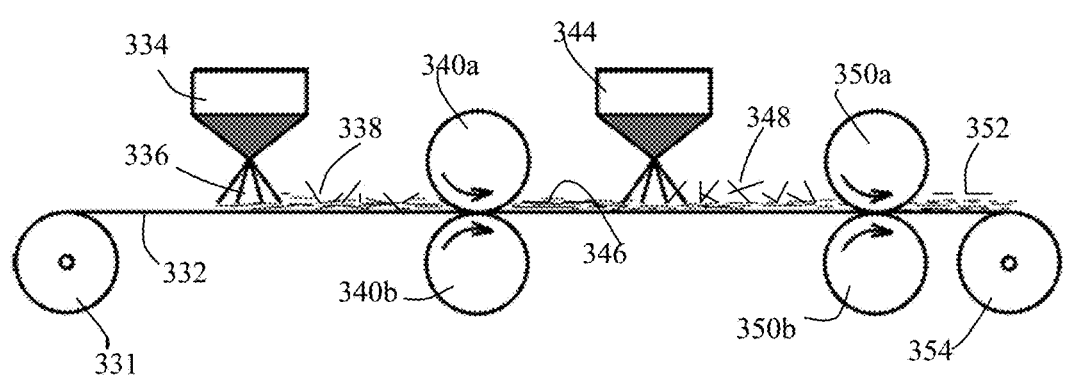
FIG. 3 A roll-to-roll (reel-to-reel) process for producing a layer of electrolyte-impregnated laminar graphite structure. Graphite flakes are well-aligned on the supporting substrate plane. The structure is then wound into a roll shape.

FIG. 3 shows a roll-to-roll process for producing a layer of electrolyte-impregnated laminar graphite structure. This process begins by feeding a continuous solid substrate 332 (e.g. PET film or stainless steel sheet) from a feeder roller 331. A dispenser 334 is operated to dispense dispersion 336 of graphite flakes and electrolyte onto the substrate surface to form a layer of deposited dispersion 338, which feeds through the gap between two compressing rollers, 340a and 340b, to form a layer of electrolyte-impregnated, highly oriented flakes of graphite worms or expanded graphite. The graphite flakes are well-aligned on the supporting substrate plane. If so desired, a second dispenser 344 is then operated to dispense another layer of dispersion 348 on the surface of the previously consolidated dispersion layer. The two-layer structure is then driven to pass through the gap between two roll-pressing rollers 350a and 350b to form a thicker layer 352 of electrolyte-impregnated laminar graphite structure, which is taken up by a winding roller 354. In certain embodiments, one can unwind the layer of electrolyte-impregnated laminar graphite structure, peel off from the PET film, and cut/slit the layer into individual sheets of desired length and wide. These sheets can be separately wound into electrode rolls of desired shape and dimensions.

Thus, in some preferred embodiments, the forced assembly procedure includes introducing a first layer of the graphite flake dispersion onto a surface of a supporting conveyor and driving the layer of graphite flake suspension supported on the conveyor through at least a pair of pressing rollers to reduce the thickness of the graphite flake dispersion layer and align the multiple graphite flakes along a direction parallel to the conveyor surface for forming a layer of electrolyte-impregnated laminar graphite structure.

If necessary, the process may further include a step of introducing a second layer of the graphite dispersion onto a surface of the layer of electrolyte-impregnated laminar structure to form a two layer laminar structure, and driving the two-layer laminar structure through at least a pair of pressing rollers to reduce a thickness of the second layer of graphite dispersion and align the multiple graphite flakes along a direction parallel to the conveyor surface for forming a layer of electrolyte-impregnated laminar structure. The same procedure may be repeated by allowing the conveyor to move toward a third set of pressing rollers, depositing additional (third) layer of graphite dispersion onto the two-layer structure, and forcing the resulting 3-layer structure to go through the gap between the two rollers in the third set to form a further compacted, electrolyte-impregnated laminar graphite structure.

The above paragraphs about FIG. 3 are but one of the many examples of possible apparatus or processes that can be adapted to produce electrolyte-impregnated laminar graphite strictures that contain highly oriented and closely packed flakes of graphite worms or expanded graphite spaced by thin layers of electrolyte. The conventional paper-making procedures may also be adapted to produce electrolyte-impregnated graphite flake paper, which is then compressed or roll-pressed between a pair of two rollers to produce the electrolyte-impregnated laminar graphite structure containing highly oriented graphite flakes (being oriented along the laminar plane). This structure is then wound into a roll shape to produce an electrode roll, which now contains flakes of graphite worms or expanded graphite oriented on the plane defined by the roll length and roll width and perpendicular to the roll thickness.

Exfoliated graphite may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). The resulting graphite oxide particles (sulfuric acid-intercalated graphite or graphite intercalation compound, GIC) may then be subjected to thermal exfoliation to produce exfoliated graphite worms. Graphite worms are composed of exfoliated graphite flakes that remain weakly interconnected. Graphite worms may be broken up by using mechanical shearing, air jet milling, ultrasonication, etc.

The aforementioned features are further described and explained in detail as follows: As illustrated in FIG. 1(B), a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 1(B), different crystallites in a graphite particle are typically oriented in different directions and, hence, a particular property of a multi-crystallite graphite particle is the directional average value of all the constituent crystallites.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 1(B)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as graphite worms 104.

These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm$^3$ for most applications.

Figure 1A:
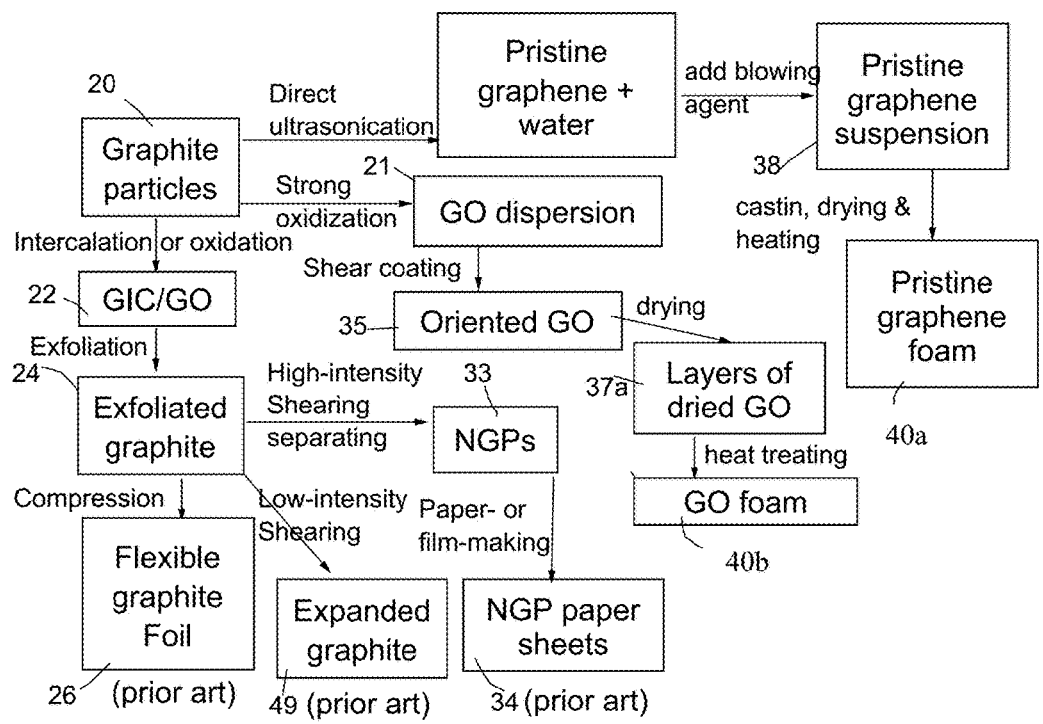
FIG. 1(A) A flow chart illustrating various prior art processes of producing exfoliated graphite products (graphite worms, flexible graphite foils and expanded graphite flakes), along with a process for producing pristine graphene foam 40a or graphene oxide foams 40b.
Figure 1B:
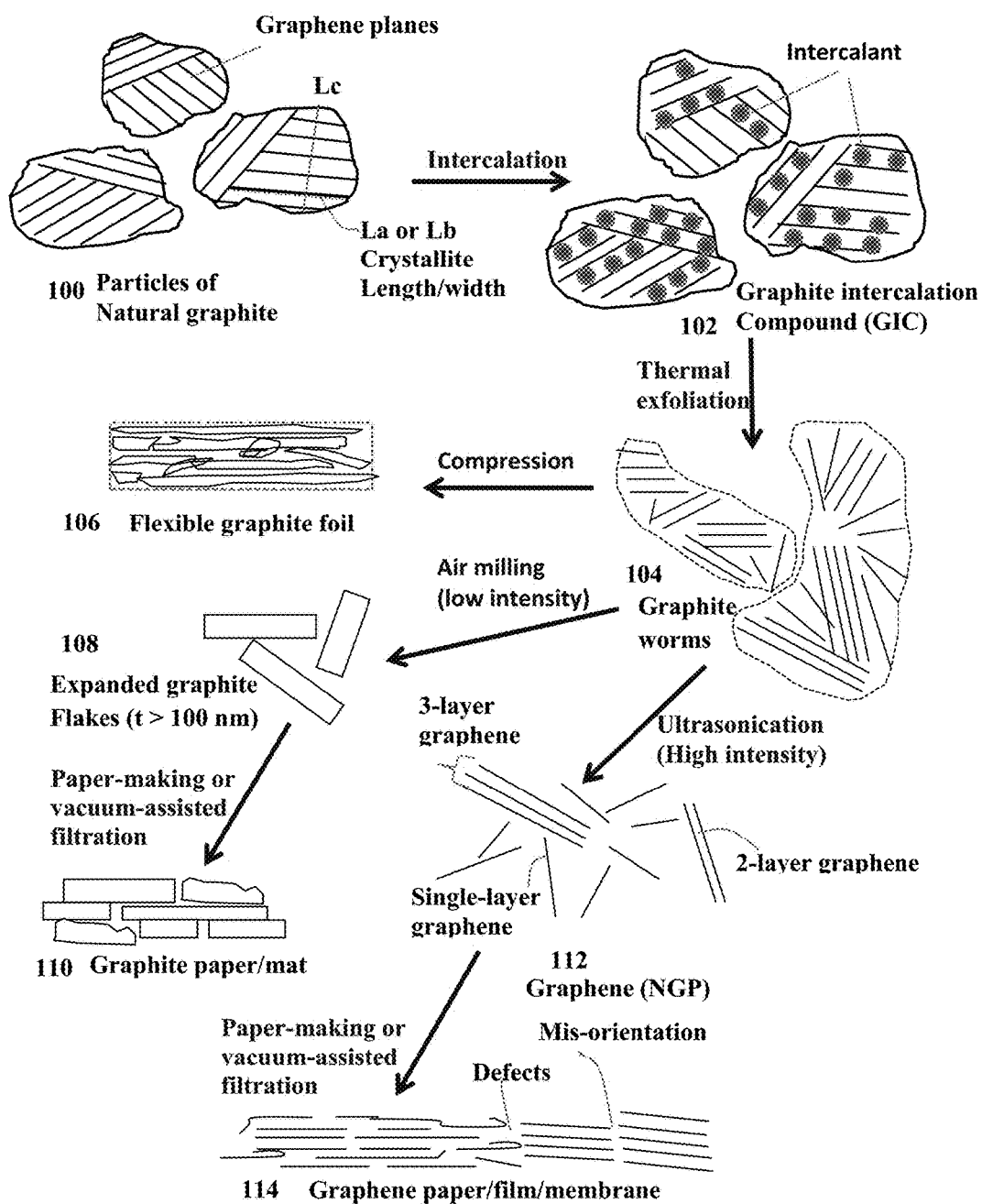
FIG. 1(B) Schematic drawing illustrating the processes for producing conventional paper, mat, film, and membrane of simply aggregated graphite flakes (flake thickness >100 nm) or graphene sheets (<10 nm in thickness, more preferably <2 nm, and most preferably single-layer graphene). All processes begin with intercalation and/or oxidation treatment of graphitic materials (e.g. natural graphite particles).

The upper left portion of FIG. 1(A) shows a flow chart that illustrates the prior art processes used to fabricate flexible graphite foils. The processes typically begin with intercalating graphite particles 20 (e.g., natural graphite or synthetic graphite) with an intercalant (typically a strong acid or acid mixture) to obtain a graphite intercalation compound 22 (GIC). After rinsing in water to remove excess acid, the GIC becomes "expandable graphite." The GIC or expandable graphite is then exposed to a high temperature environment (e.g., in a tube furnace preset at a temperature in the range of 800-1,050° C.) for a short duration of time (typically from 15 seconds to 2 minutes). This thermal treatment allows the graphite to expand in its c-axis direction by a factor of 30 to several hundreds to obtain a worm-like vermicular structure 24 (graphite worm), which contains exfoliated, but un-separated graphite flakes with large pores interposed between these interconnected flakes.

In one prior art process, the exfoliated graphite (or mass of graphite worms) is re-compressed by using a calendaring or roll-pressing technique to obtain flexible graphite foils (26 in FIG. 1(A) or 106 in FIG. 1(B)), which are typically 100-300 µm thick. In another prior art process, the exfoliated graphite worm 24 may be impregnated with a resin and then compressed and cured to form a flexible graphite composite, which is normally of low strength as well. In addition, upon resin impregnation, the electrical and thermal conductivity of the graphite worms could be reduced by two orders of magnitude.

Alternatively, the exfoliated graphite may be subjected to high-intensity mechanical shearing/separation treatments using a high-intensity air jet mill, high-intensity ball mill, or ultrasonic device to produce separated nano graphene platelets 33 (NGPs) with all the graphene platelets thinner than 100 nm, mostly thinner than 10 nm, and, in many cases, being single-layer graphene (also illustrated as 112 in FIG. 1(B)). An NGP is composed of a graphene sheet or a plurality of graphene sheets with each sheet being a two-dimensional, hexagonal structure of carbon atoms. A mass of multiple NGPs (including discrete sheets/platelets of single-layer and/or few-layer graphene or graphene oxide, 33 in FIG. 1(A)) may be made into a graphene film/paper (34 in FIG. 1(A) or 114 in FIG. 1(B)) using a film- or paper-making process.

Further alternatively, with a low-intensity shearing, graphite worms tend to be separated into the so-called expanded graphite flakes (108 in FIG. 1(B)) having a thickness >100 nm. These flakes can be formed into graphite paper or mat 106 using a paper- or mat-making process. This expanded graphite paper or mat 106 is just a simple aggregate or stack of discrete flakes having defects, interruptions, and mis-orientations between these discrete flakes.

The exfoliated graphite worms or expanded graphite flakes may be further subjected to the following treatments, separately or in combination, prior to being dispersed in an electrolyte or impregnated by an electrolyte:

(a) subjected to an activation treatment (analogous to activation of carbon black materials) to create additional surfaces and possibly imparting functional chemical groups to these surfaces. The activation treatment can be accomplished through physical activation (e.g. using $CO_2$, or steam), chemical activation (e.g. using KOH, NaOH, etc.), or exposure to nitric acid, fluorine, or ammonia plasma.

(b) being chemically functionalized or doped with atomic, ionic, or molecular species. Useful surface functional groups may include quinone, hydroquinone, quaternized aromatic amines, mercaptans, or disulfides. This class of functional groups can impart pseudo-capacitance to graphene-based supercapacitors.

(c) coated or grafted with an intrinsically conductive polymer (conducting polymers, such as polyacetylene, polypyrrole, polyaniline, polythiophene, and their derivatives, are good choices for use in the present invention); These treatments are intended for further increasing the capacitance value through pseudo-capacitance effects such as redox reactions; and (d) deposition with transition metal oxides or sulfides, such as $RuO_2$, $TiO_2$, $MnO_2$, $Cr_2O_3$, and $Co_2O_3$, for the purpose of forming redox pairs with graphene sheets, thereby imparting pseudo-capacitance to the electrode.

In the physical activation treatment, flakes of exfoliated graphite worms or expanded graphite are activated using hot gases. These flakes are oxidizing atmospheres (oxygen or steam) at temperatures above 250° C., usually in the temperature range of 600-1200° C.

In the chemical activation treatment, flakes of exfoliated graphite worms or expanded graphite are impregnated with certain chemicals. The chemical is typically an acid, strong base, or a salt (phosphoric acid, potassium hydroxide, sodium hydroxide, calcium chloride, and zinc chloride). Then, these flakes are treated at a temperature range of 450-900° C. Chemical activation is preferred over physical activation owing to the lower temperatures and shorter time needed for activating material.

In the instant invention, there is no limitation on the type of liquid or gel electrolytes that can be used in the supercapacitor: aqueous, organic, gel, and ionic liquid. Typically, electrolytes for supercapacitors consist of solvent and dissolved chemicals (e.g. salts) that dissociate into positive ions (cations) and negative ions (anions), making the electrolyte electrically conductive. The more ions the electrolyte contains, the better its conductivity, which also influences the capacitance. In supercapacitors, the electrolyte provides the molecules for the separating monolayer in the Helmholtz double-layer (electric double layer) and delivers the ions for pseudocapacitance.

Water is a relatively good solvent for dissolving inorganic chemicals. When added together with acids such as sulfuric acid ($H_2SO_4$), alkalis such as potassium hydroxide (KOH), or salts such as quaternary phosphonium salts, sodium perchlorate ($NaClO_4$), lithium perchlorate ($LiClO_4$) or lithium hexafluoride arsenate ($LiAsF_6$), water offers relatively high conductivity values. Aqueous electrolytes have a dissociation voltage of 1.15 V per electrode and a relatively low operating temperature range. Water electrolyte-based supercapacitors exhibit low energy density.

Alternatively, electrolytes may contain organic solvents, such as acetonitrile, propylene carbonate, tetrahydrofuran, diethyl carbonate, γ-butyrolactone, and solutes with quaternary ammonium salts or alkyl ammonium salts such as tetraethylammonium tetrafluoroborate ($N(Et)_4BF_4$) or triethyl (metyl) tetrafluoroborate ($NMe(Et)_3BF_4$). Organic electrolytes are more expensive than aqueous electrolytes, but they have a higher dissociation voltage of typically 1.35 V per electrode (2.7 V capacitor voltage), and a higher temperature range. The lower electrical conductivity of organic solvents (10 to 60 mS/cm) leads to a lower power density, but a higher energy density since the energy density is proportional to the square of the voltage.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a supercapacitor.

In order to make a pseudo-capacitor (a supercapacitor that works on the development of pseudo-capacitance through redox pair formation), the anode active material or cathode active material may be designed to contain graphite flakes and a redox pair partner material selected from a metal oxide, a conducting polymer (e.g. conjugate-chain polymers), a non-conducting polymer (e.g. polyacrylonitrile, PAN), an organic material (e.g. hydroquinone), a non-graphene carbon material, an inorganic material, or a combination thereof. Many of the materials that can pair up with graphite flakes are well-known in the art. In this study, we have come to realize that both activated and non-activated versions of the flakes of graphite worms or expanded graphite can work with a wide variety of partner materials to form a redox pair for developing pseudo-capacitance.

For instance, the metal oxide or inorganic materials that serve in such a role include $RuO_2$, $IrO_2$, NiO, $MnO_2$, $VO_2$, $V_2O_5$, $V_3O_8$, $TiO_2$, $Cr_2O_3$, $Co_2O_3$, $Co_3O_4$, $PbO_2$, $Ag_2O$, $MoC_x$, $Mo_2N$, or a combination thereof In general, the inorganic material may be selected from a metal carbide, metal nitride, metal boride, metal dichalcogenide, or a combination thereof. Preferably, the desired metal oxide or inorganic material is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nanodisc, nanoribbon, or nanoplatelet form. These materials or their precursors can be incorporated in the coating slurry prior to the coating or film forming procedure. Alternatively, their molecular precursors in a liquid solution may be impregnated into the pores of the graphene foam and the precursor is then thermally or chemically converted into the desired inorganic species (e.g. transition metal oxide). The liquid or gel electrolyte is then impregnated into the foam.

The following examples are used to illustrate some specific details about the best modes of practicing the instant invention and should not be construed as limiting the scope of the invention.

EXAMPLE 1

Preparation of Exfoliated Graphite Worms and Expanded Graphite Flakes from Short Graphite Fibers Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 4 hours of reaction, the acid-treated graphite fibers or natural graphite particles were filtered and washed thoroughly with deionized water until the pH level of the solution reached 6. After drying the product at 100° C. overnight, we obtained a graphite intercalation compound (GIC) or graphite oxide fiber.

The GIC was then submitted to a thermal exfoliation treatment at 800° C. for 45 seconds to obtain exfoliated graphite worms. Some of these worms were submitted to low-intensity shearing using a kitchen-scale food processor to produce expanded graphite flakes.

Part of the expanded graphite flakes was mixed with NMP to form a slurry, which was then coated onto both primary surfaces of a sheet of Al foil (serving as a current collector). The maximum thickness of expanded graphite flake layer coated on each side of Al foil was approximately 85 μm, beyond which the electrode layer has the tendency to get cracked or delaminated when NMP was removed. Two pieces of electrodes, each with Al foil coated with expanded graphite (+5% acetylene black and 7% PVDF binder resin), spaced by a porous separator, were laminated to form a supercapacitor cell. The cell was enclosed in a nylon-Al laminated housing (envelop), injected with a liquid electrolyte, and then sealed. This is a conventional symmetric EDLC supercapacitor.

The remaining portion of the expanded graphite flakes was dispersed in the same liquid electrolyte to form a dispersion. Part of the dispersion was compressed and consolidated into a layer of electrolyte-impregnated, compacted and highly oriented graphite flakes (electrolyte-impregnated laminar graphite flake structure) according to the process illustrated in FIG. 3. This was bonded to a current collector (Al foil) with the graphite flakes aligned parallel to the Al foil plane. This two-layer structure was wound into a roll shape for use in a Type-I rolled supercapacitor. Other part of the dispersion was made into a layer of electrolyte-impregnated laminar graphite structure having aligned graphite flakes, but this layer was then peeled off from the current collector. The layer of electrolyte-impregnated laminar graphite structure was wound into a roll shape for use in a Type-II rolled supercapacitor.

EXAMPLE 2

Preparation of Exfoliated Graphite Worms and Expanded Graphite Flakes from Meso-carbon Micro-beads (MCMBs)

Meso-carbon microbeads (MCMBs) were supplied from China Steel Chemical Co., Kaohsiung, Taiwan. This material has a density of about 2.24 g/cm$^3$ with a median particle size of about 16 μm. MCMB (10 grams) were intercalated with an acid solution (sulfuric acid, nitric acid, and potassium permanganate at a ratio of 4:1:0.05) for a period of time from 4 hours up to 48 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was no less than 4.0. The slurry was then dried in a vacuum for 24 hours to obtain a graphite intercalation compound (GIC).

The GIC was then thermally exfoliated at 650° C. for 1 minute to produce exfoliated graphite worms, which were divided into two portions. One portion was subjected to chemical activation by mixing the graphite worms with KOH at a 1:1 weight ratio and then heated the mixture to 800° C. for 2 hours to produce activated graphite worms, having a specific surface area of 1,775 m$^2$/g. The other portion, having a specific surface area of 344 m$^2$/g, was used as a control sample. The graphite worms, with or without chemical activation, were then made into supercapacitor electrodes and supercapacitor cells using both the presently invented processes (as illustrated in FIG. 3) and the conventional production process (preparation of NMP/exfoliated graphite slurry, coating, drying, cell lamination, and electrolyte injection).

EXAMPLE 3

Preparation of Exfoliated Graphite Worms and Electrodes from Natural Graphite

Graphite intercalation compound or graphite oxide was prepared by oxidation of natural flake graphite with an oxidizer liquid consisting of sulfuric acid, sodium nitrate, and potassium permanganate at a ratio of 4:1:0.05 at 30° C. When natural graphite flakes (particle sizes of 25 μm) were immersed and dispersed in the oxidizer mixture liquid for 4 hours, the suspension or slurry remains optically opaque and dark. After this, the reacting mass was rinsed with water 3 times to adjust the pH value to at least 3.0. The mass was then dried in a vacuum oven at 80° C. for 24 hours to obtain a GIC. The GIC was thermally exfoliated at 900° C. for 60 seconds to obtain exfoliated graphite worms. Some of the worms were subjected to low-intensity shearing using a food processor to obtain expanded graphite flakes. Some amount of the worms and some amount of the expanded graphite flakes were subjected to chemical activation (using NaOH melt at 800° C. for 6 hours) to obtain activated graphite worms and activated expanded graphite flakes, respectively.

Some of these graphite flakes (activated or non-activated) and some of these graphite worms (activated or non-activated) were then dispersed in an electrolyte to form several dispersion samples, which were then made into supercapacitor electrodes using the presently invented process (roll-pressing-based as illustrated in FIG. 3) to produce both Type-I and Type-II supercapacitor cells. Some were made into conventional supercapacitors using the prior art slurry coating approach.

EXAMPLE 4

Preparation of Intrinsically Conductive Polymer-graphene Redox Pairs

In this series of examples, intrinsically conductive polymers (e.g. polyaniline, poly polypyrrole, and polythiophene) and their sulfonated versions were evaluated for their effectiveness as a redox pair partner material with a graphite flake material.

The chemical synthesis of the sulfonated polyaniline (S-PANi) was accomplished by reacting polyaniline with concentrated sulfuric acid. The procedure was similar to that used by Epstein, et al. (U.S. Pat. No. 5,109,070, Apr. 28, 1992). The resulting S-PANi can be represented by the following Formula 1, with $R_1$, $R_2$, $R_3$, and $R_4$ group being H, $SO_3^-$ or $SO_3H$ ($R_5$=H) with the content of the latter two being varied between 30% and 75% (i.e., the degree of sulfonation varied between 30% and 75%).

The electron conductivity of these $SO_3^-$ or $SO_3H$-based S-PANi compositions was in the range of 0.1 S/cm to 0.5 S/cm when the degree of sulfonation was from approximately 30% to 75% (with y being approximately 0.4-0.6). The S-PANi/water solution was mixed with expanded graphite flake (EGF)/water solution at a S-PANi/EGF weight ratio of 1/5-1/2 and, upon water removal, the S-PANi was precipitated out and coated onto the EGF surfaces for forming a redox pair. The polymer-coated EGF was then dispersed in electrolyte and made into pseudo-capacitance electrodes using both the presently invented process and the conventional process.

A sulfonated pyrrole-based polymer (with X=NH and Y=$SO_3^-$, m=1, and A=H in the following formula) was synthesized by following a procedure adapted from Aldissi, et al., U.S. Pat. No. 4,880,508, Nov. 14, 1989.

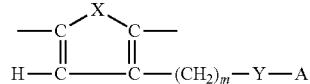

(Formula 2)

For solution impregnation, as one example, approximately 5.78 g of the resulting sulfonated polypyrrole was dissolved in 100 ml of distilled water. Then, the aqueous solution was mixed with EGF/water solution and the resulting liquid mixture was dried to allow for precipitation and deposition of sulfonated polypyrrole onto surfaces of expanded graphite flakes to form a redox pair. Conductive polymer-coated expanded graphite flakes were then dispersed in a liquid electrolyte and made into pseudo-capacitance electrodes using both the presently invented process and the conventional process.

Water-soluble conductive polymers having a thiophene ring (X=sulfur) and alkyl groups containing 4 carbon atoms (m=4) in the above Formula 2 were prepared, according to a method adapted from Aldissi, et al. (U.S. Pat. No. 4,880, 508, Nov. 14, 1989). The surfactant molecules of these polymers were sulfonate groups with sodium. Conductivity of this polymer in a self-doped state was found to be from about $10^{-3}$ to about $10^{-2}$ S/cm.

A doped poly (alkyl thiophene) (PAT) with Y=$SO_3H$ and A=H in Formula 2 that exhibited an electron conductivity of 12.5 S/cm was dissolved in an aqueous hydrogen peroxide ($H_2O_2$) solution. The resulting polymer solution was mixed with an EGF/water solution and dried to form a redox pair. Conductive polymer-coated expanded graphite flakes were then dispersed in a liquid electrolyte and made into pseudo-capacitance electrodes using both the presently invented process and the conventional process.

We have surprisingly discovered that the sulfonated conductive polymer (e.g. S-PANi), paired up with an EGF material and prepared with the presently invented compressing consolidating, and rolling approach, leads to a signifi-

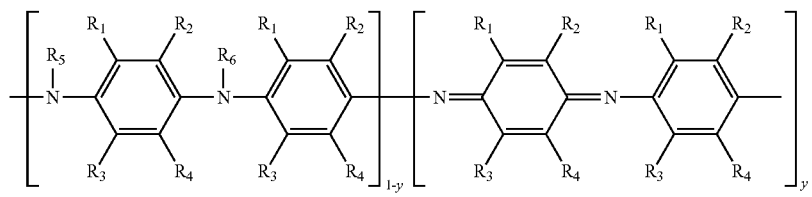

(Formula 1)

cantly higher pseudo-capacitance value when compared with the corresponding electrode materials prepared by the conventional approach; e.g. 755 F/g vs. 554 (S-PANi); 653 F/cm$^3$ vs. 343 F/cm$^3$ (S-PPy); and 557 F/g vs. 312 F/g (S-PAT).

EXAMPLE 5

Preparation of MnO$_2$-expanded Graphite Flake Redox Pairs

The MnO$_2$ powder was synthesized in the presence of expanded graphite flakes (EGF). In this method, a 0.1 mol/L KMnO$_4$ aqueous solution was prepared by dissolving potassium permanganate in deionized water. Meanwhile 13.3 g surfactant of high purity sodium bis(2-ethylhexyl) sulfosuccinate was added in 300 mL iso-octane (oil) and stirred well to obtain an optically transparent solution. Then, 32.4 mL of 0.1 mol/L KMnO$_4$ solution were added in the solution, which was followed by dispersing pristine EGF in the solution. The resulting suspension was ultrasonicated for 30 min and a dark brown precipitate of MnO$_2$ was coated on surfaces of EGF. The products were recovered, washed several times with distilled water and ethanol, and dried at 80° C. for 12 h. The samples were MnO$_2$-coated EGF, which were re-dispersed into a liquid electrolyte to form a dispersion. This EGF-electrolyte dispersion was then consolidated into an electrolyte-impregnated laminar graphite structure using the vacuum-assisted method (FIG. 3). In such a structure, EGF and MnO$_2$ form a redox pair operating to produce pseudo-capacitance in a supercapacitor. For comparison, a corresponding supercapacitor was made using conventional slurry coating, drying, packaging, and electrolyte injection. Even with the presence of MnO$_2$ phase coated on graphite flake surfaces, the presently invented method is capable of closely packing and highly orienting the coated graphite flakes into an electrode of a high tap density with thin electrolyte layers inter-spaced between coated graphite flakes. The specific capacitance values of the resulting supercapacitor are 423 F/g and 528 F/cm$^3$, which are significantly higher than the 288 F/g and 214 F/cm$^3$ of its conventional counterpart prepared by the conventional procedures of combined slurry coating, drying, laminating, and electrolyte injection. The differences are quite dramatic and unexpected.

EXAMPLE 6

Details About Evaluation of Various Supercapacitor Cells

In most of the examples investigated, both the inventive supercapacitor cells and their conventional counterparts were fabricated and evaluated. The latter cells, for comparison purposes, were prepared by the conventional procedures of slurry coating of electrodes, drying of electrodes, assembling of anode layer, separator, and cathode layer, packaging of assembled laminate, and injection of liquid electrolyte. In a conventional cell, an electrode (cathode or anode), is typically composed of 85% an electrode active material (e.g. activated carbon, inorganic nanodiscs, etc.), 5% Super-P (acetylene black-based conductive additive), and 10% PTFE, which were mixed and coated on Al foil. The thickness of electrode is around 100 μm. For each sample, both coin-size and pouch cells were assembled in a glove box. The capacity was measured with galvanostatic experiments using an Arbin SCTS electrochemical testing instrument. Cyclic voltammetry (CV) and electrochemical impedance spectroscopy (EIS) were conducted on an electrochemical workstation (CHI 660 System, USA).

Galvanostatic charge/discharge tests were conducted on the samples to evaluate the electrochemical performance. For the galvanostatic tests, the specific capacity (q) is calculated as $$q=I*t/m \quad (1)$$

where I is the constant current in mA, t is the time in hours, and m is the cathode active material mass in grams. With voltage V, the specific energy (E) is calculated as, $$E=\int Vdq \quad (2)$$

The specific power (P) can be calculated as $$P=(E/t) \text{ (W/kg)} \quad (3)$$

where t is the total charge or discharge step time in hours.

The specific capacitance (C) of the cell is represented by the slope at each point of the voltage vs. specific capacity plot, $$C=dq/dV \quad (4)$$

For each sample, several current density (representing charge/discharge rates) were imposed to determine the electrochemical responses, allowing for calculations of energy density and power density values required of the construction of a Ragone plot (power density vs. energy density).

EXAMPLE 7

Achievable Electrode Tap Density and its Effect on Electrochemical Performance of Supercapacitor Cells The presently invented process allows us to prepare a graphite flake electrode of any practical tap density from 0.1 to 1.6 g/cm$^3$. It may be noted that the graphite flake-based supercapacitor electrodes prepared by conventional processes are limited to <0.3 and mostly <0.2 g/cm$^3$. Furthermore, as discussed earlier, only thinner electrodes can be prepared using these conventional processes. As a point of reference, the activated carbon-based electrode exhibits a tap density typically from 0.3 to 0.5 g/cm$^3$.

Figure 4:
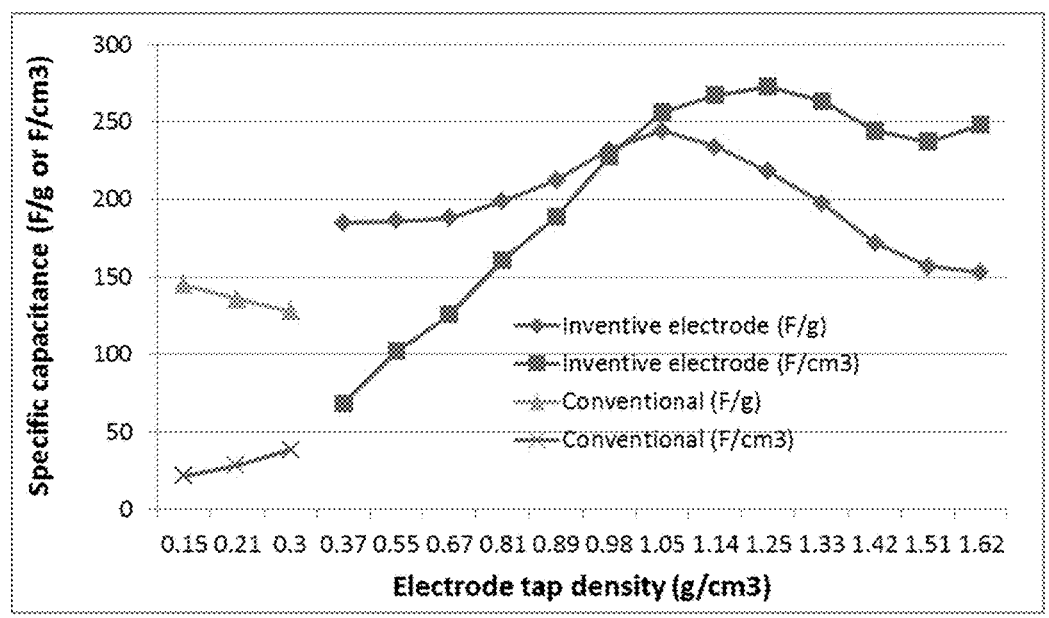
FIG. 4 The electrode specific capacitance values of two series of supercapacitors (conventional and presently invented rolled cells) plotted as a function of the electrode density.

A series of EDLC electrodes with different tap densities were prepared from the same batch of electrolyte-impregnated graphite flake laminar structures, but roll-pressed to different extents. The volume and weights of an electrode were measured before and after electrolyte removal and before and after roll-pressing. These measurements enabled us to estimate the tap density of the dried electrode (wet electrode volume/weight minus the amount of electrolyte actually absorbed). For comparison purposes, graphite flake-based electrodes of comparable thickness (70-75 um) were also prepared using the conventional slurry coating process (the wet-dry-wet procedures). The electrode specific capacitance values of these supercapacitors using an organic electrolyte (acetonitrile) are summarized in FIG. 4. There are several significant observations that can be made from these data:

(A) Given comparable electrode thickness, the presently invented activated graphite flake-based supercapacitors exhibit significantly higher gravimetric specific capacitance (153-244 F/g) as compared to those (128-145 F/g) of the corresponding graphene-based electrodes prepared by the conventional process, all based on EDLC alone.

(B) The highest achievable tap density of the electrode prepared by the conventional method is 0.15-0.30 g/cm$^3$. In contrast, the presently invented process makes it possible to achieve a tap density of 0.3-1.65 g/cm3 (based on this series of samples alone); these unprecedented values even surpass those (0.3-0.5 g/cm$^3$) of activated carbon electrodes by a large margin.

(C) The presently invented graphite flake electrodes exhibit a volumetric specific capacitance up to 267 F/cm$^3$, which is also an unprecedented value. In contrast, the graphite flake electrodes prepared according to the conventional method shows a specific capacitance in the range of 22-39 F/cm$^3$; the differences are dramatic.

Figure 5:
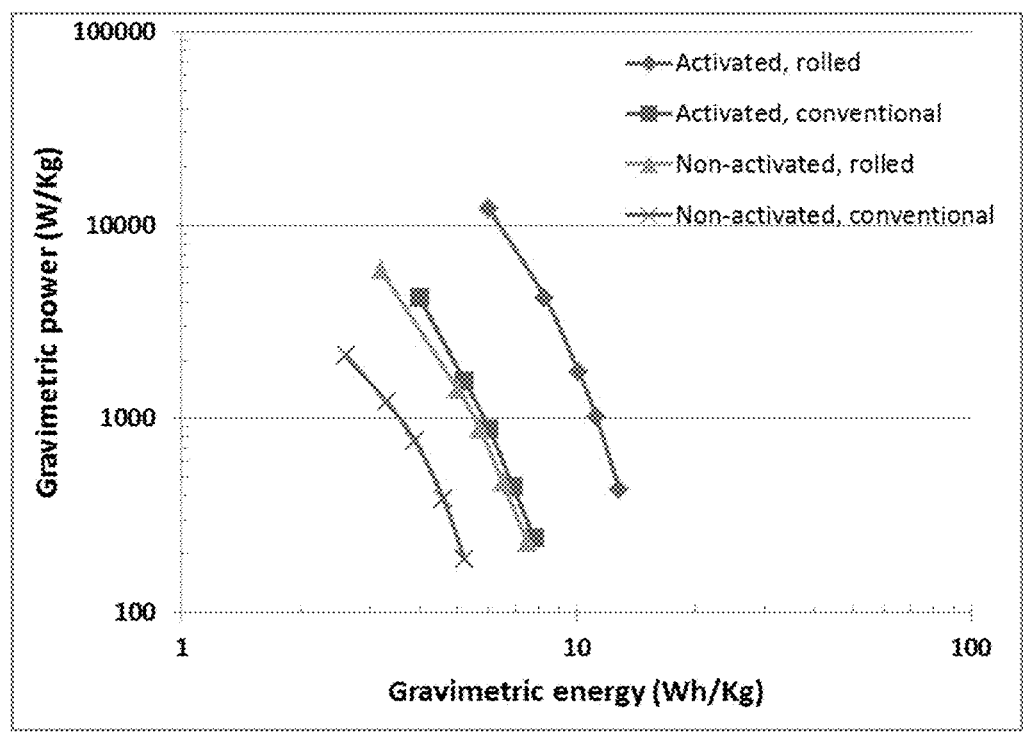
FIG. 5 Ragone plots (gravimetric power density vs. energy density) of four symmetric supercapacitor (EDLC) cells containing activated and non-activated expanded graphite flakes (obtained from MCMBs) as the electrode active material and EMIMBF4 ionic liquid electrolyte. Two supercapacitors (rolled cells) were prepared according to an embodiment of instant invention and, for comparison, the other two cells by the conventional slurry coating of electrodes.

Shown in FIG. 5 are Ragone plots (gravimetric power density vs. energy density) of four symmetric supercapacitor (EDLC) cells containing activated and non-activated expanded graphite flakes (obtained from MCMBs) as the electrode active material and EMIMBF4 ionic liquid electrolyte. Two supercapacitors were prepared according to an embodiment of instant invention and, for comparison, two by the conventional slurry coating of electrodes. Several significant observations can be made from these data:

(A) Both the gravimetric energy densities and power densities of the rolled supercapacitor cells prepared by the presently invented method are significantly higher than those of their counterparts prepared via the conventional method. The differences are highly dramatic. The presently invented approach enables the production of significantly thicker electrodes and orientation of expanded graphite flakes that is conducive to fast ion migration and formation of electric double layers. The inventive method is also more capable of effectively packing graphite flakes together without graphite flake re-stacking (due to pre-impregnated electrolyte serving as a spacer) and without forming any dry spots (having no spaces not accessible to liquid electrolyte).

(B) Activation of expanded graphite flakes led to significantly higher specific capacitance likely dues to the significantly higher specific surface area. With or without activation, expanded graphite flakes provide much higher specific capacitance if they are properly oriented.

Figure 6:
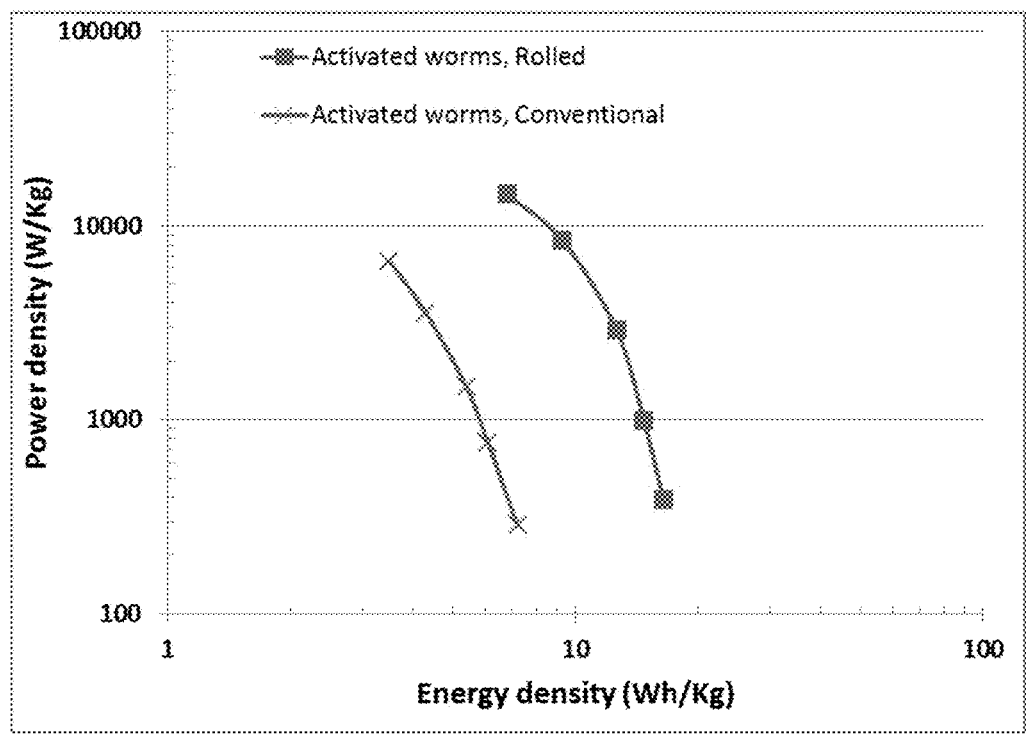
FIG. 6 Ragone plots of two EDLC supercapacitors containing activated exfoliated graphite worms (obtained from chopped graphite fibers): one being a rolled cell and the other conventional cell.

FIG. 6 shows the Ragone plots of two EDLC supercapacitors containing activated exfoliated graphite worms (obtained from chopped graphite fibers) that are oriented parallel and perpendicular, respectively, to the current collector surface plane. It is clear that, when the constituent graphite flakes of worms are oriented perpendicular to the current collector plane (i.e. parallel to the ion movement direction), the resulting electrodes can store larger amounts of charges and deliver higher power. The maximum energy density, 16.4 Wh/kg), is 2.5 times higher as compared to those of current commercial supercapacitors. The maximum power density, 14,666 W/kg, is approximately 2 times that of commercial supercapacitor cells.

Figure 7:
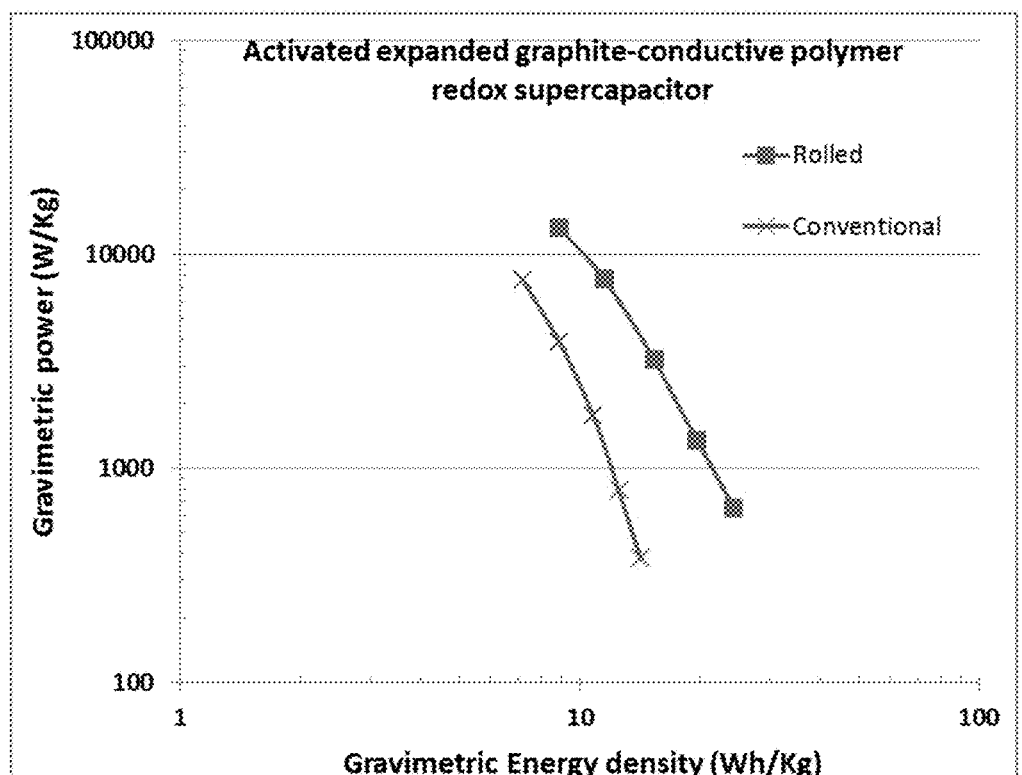
FIG. 7 Ragone plots of two activated expanded graphite-conductive polymer redox supercapacitors (pseudo-capacitors) having activated expanded graphite/sulfonated polyaniline (S-PANi) redox pairs: one produced by the instant process (rolled cell having flakes oriented perpendicular to the separator plane) and the other by the conventional process.

FIG. 7 shows the Ragone plots of two activated expanded graphite-conductive polymer redox supercapacitors (pseudo-capacitors) having activated expanded graphite/sulfonated polyaniline (S-PANi) redox pairs: one produced by the instant process (flakes in the roll oriented perpendicular to the separator plane) and the other by the conventional process. Both contain Na$_2$SO$_4$ aqueous electrolyte. Quite unexpectedly, sulfonated conductive polymers, when paired up with properly oriented activated expanded graphite flakes, lead to a supercapacitor exhibiting an exceptionally high energy density and high power density. Both the energy density and power density are significantly higher than those of the supercapacitor prepared by the conventional slurry coating method.

Figure 8:
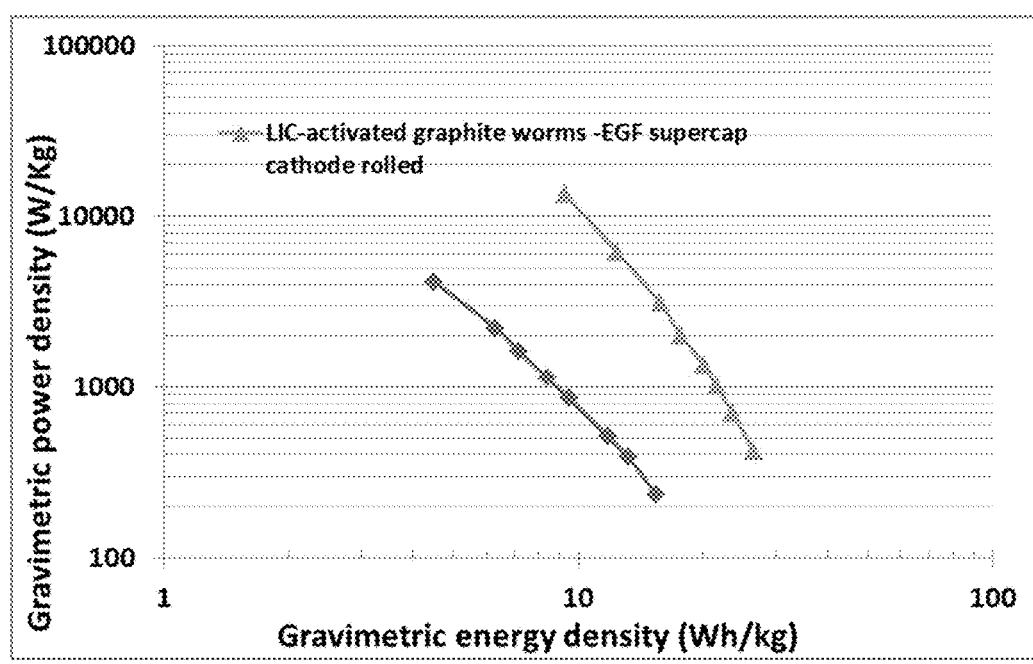
FIG. 8 Ragone plots of lithium ion capacitor (LIC) cells containing an anode of prelithiated graphite, activated exfoliated graphite worms as the cathode electrode active material and lithium salt-PC/DEC organic liquid electrolyte. Supercapacitors were prepared according to an embodiment of instant invention (rolled cell) and by the conventional slurry coating of electrodes.

Shown in FIG. 8 are Ragone plots of lithium ion capacitor (LIC) cells containing activated exfoliated graphite worms as the cathode active material, prelithiated graphite particles as the anode active material, and lithium salt (LiPF$_6$)-PC/DEC as organic liquid electrolyte. The data are for both LICs, wherein the cathode is prepared by the presently invented electrolyte-worm compressing and consolidating method and those by the conventional slurry coating of electrodes. These data indicate that the gravimetric energy densities and power densities of the LIC cells prepared by the presently invented method are significantly higher than those of their counterparts prepared via the conventional method. Again, the differences are huge.

It is of significance to point out that reporting the energy and power densities per unit of active material weight alone on a Ragone plot, as did by many researchers, may not give a realistic picture of the performance of the assembled supercapacitor cell. The weights of other device components also must be taken into account. These overhead components, including current collectors, electrolyte, separator, binder, connectors, and packaging, are non-active materials and do not contribute to the charge storage amounts. They only add weights and volumes to the device. Hence, it is desirable to reduce the relative proportion of overhead component weights and increase the active material proportion. However, it has not been possible to achieve this objective using conventional supercapacitor production processes. The present invention overcomes this long-standing, most serious problem in the art of supercapacitors.

In a commercial supercapacitor having an electrode thickness of 150 μm, the weight of the active material (i.e. activated carbon) accounts for about 30% of the total mass of the packaged cell. Hence, a factor of 3 to 4 is frequently used to extrapolate the energy or power densities of the device (cell) from the properties based on the active material weight alone. In most of the scientific papers, the properties reported are typically based on the active material weight alone and the electrodes are typically very thin («100 μm, and mostly «50 μm). The active material weight is typically from 5% to 10% of the total device weight, which implies that the actual cell (device) energy or power densities may be obtained by dividing the corresponding active material weight-based values by a factor of 10 to 20. After this factor is taken into account, the properties reported in these papers do not really look any better than those of commercial supercapacitors. Thus, one must be very careful when it comes to read and interpret the performance data of supercapacitors reported in the scientific papers and patent applications.

In conclusion, we have successfully developed an absolutely new, novel, unexpected, and patently distinct class of supercapacitor cells (rolled cells), rolled electrodes containing highly conducting graphite flakes, and related processes of production. These rolled electrodes, containing closely packed and highly oriented flakes of exfoliated graphite worms or expanded graphite interspaced with electrolyte, lead to exceptional supercapacitors exhibiting surprisingly high energy densities and power densities based on per unit of cell weight.

We claim:

1. A rolled supercapacitor comprising an anode, a cathode, a porous separator electronically separating said anode and said cathode, and an electrolyte in ionic contact with said anode and said cathode, wherein said anode contains a wound anode roll of an anode active material having an anode roll length, an anode roll width, and an anode roll thickness, wherein said anode active material contains flakes of exfoliated graphite worms or expanded graphite and wherein these flakes are oriented substantially parallel to a plane defined by said anode roll length and said anode roll width; and/or said cathode contains a wound cathode roll of a cathode active material having a cathode roll length, a cathode roll width, and a cathode roll thickness, wherein said cathode active material contains flakes of exfoliated graphite worms or expanded graphite that are oriented substantially parallel to a plane defined by said cathode roll length and said cathode roll width; and wherein said anode roll width and/or said cathode roll width is substantially perpendicular to said separator.

2. The rolled supercapacitor of claim 1, wherein said flakes contain activated flakes of exfoliated graphite worms or expanded graphite having a specific surface area from 500 to 3,300 m$^2$/g.

3. The rolled supercapacitor of claim 1, wherein said flakes are attached to or coupled with a nanoscaled coating or particles of a redox pair partner selected from an intrinsically conductive polymer, a transition metal oxide, and/or an organic molecule, wherein said redox pair partner and said graphene sheets form a redox pair for pseudo-capacitance.

4. The rolled supercapacitor of claim 3, wherein said intrinsically conducting polymer is selected from polyaniline, polypyrrole, polythiophene, polyfuran, sulfonated polyaniline, sulfonated polypyrrole, sulfonated polythiophene, sulfonated polyfuran, sulfonated polyacetylene, or a combination thereof.

5. The rolled supercapacitor of claim 2, wherein said activated flakes are attached to or coupled with a nanoscaled coating or particles of a redox pair partner selected from an intrinsically conductive polymer, a transition metal oxide, and/or an organic molecule, wherein said redox pair partner and said graphene sheets form a redox pair for pseudo-capacitance.

6. The rolled supercapacitor of claim 5, wherein said intrinsically conducting polymer is selected from polyaniline, polypyrrole, polythiophene, polyfuran, sulfonated polyaniline, sulfonated polypyrrole, sulfonated polythiophene, sulfonated polyfuran, sulfonated polyacetylene, or a combination thereof.

7. The rolled supercapacitor of claim 1, further containing an anode tab connected to or integral with said anode and a cathode tab connected to or integral with said cathode.

8. The rolled supercapacitor of claim 1, further comprising a casing that encloses said anode, said cathode, said separator, and said electrolyte therein to form a sealed supercapacitor.

9. The rolled supercapacitor of claim 1, wherein said wound anode roll of an anode active material contains (a) a layer of supporting solid substrate having two primary surfaces wherein either one or both of said primary surfaces are coated with said anode active material, an optional conductive additive, and an optional binder or (b) a layer of supporting porous substrate having pores that are impregnated with said anode active material, an optional conductive additive, and an optional binder.

10. The rolled supercapacitor of claim 1, wherein said wound cathode roll of a cathode active material contains (a) a layer of supporting solid substrate having two primary surfaces wherein either one or both of said primary surfaces are coated with said cathode active material, an optional conductive additive, and an optional binder or (b) a layer of supporting porous substrate having pores that are impregnated with said cathode active material, an optional conductive additive, and an optional binder.

11. The rolled supercapacitor of claim 1, wherein said electrolyte and said flakes in said anode or said cathode are assembled into an electrolyte-impregnated laminar graphite flake structure that is wound into said anode roll or said cathode roll, wherein said flakes are alternately spaced by thin electrolyte layers, having a thickness from 0.4 nm to 10 nm, and said laminar graphite flake structure has a physical density from 0.5 to 1.7 g/cm$^3$ and a specific surface area from 50 to 3,300 m$^2$/g, when measured in a dried state of said laminar structure without the presence of said electrolyte.

12. The rolled supercapacitor of claim 1, wherein said liquid electrolyte contains an aqueous electrolyte, an organic electrolyte, an ionic liquid electrolyte, or a mixture of an organic and an ionic electrolyte.

13. A rolled supercapacitor comprising an anode current collector, an anode supported by said anode current collector, a cathode, a cathode current collector supporting said cathode, an ion-permeable separator that electronically separates said anode and said cathode, and an electrolyte in ionic contact with said anode and said cathode, wherein the anode and/or the cathode contains a wound roll of an electrolyte-impregnated laminar graphite structure, which is composed of multiple graphite flakes of graphite worms or expanded graphite being alternately spaced by thin electrolyte layers, less than 5 nm in thickness, and said multiple graphite flakes are substantially aligned along a desired direction perpendicular to said separator, and wherein said laminar graphite structure has a physical density from 0.5 to 1.7 g/cm$^3$ and a specific surface area from 50 to 3,300 m$^2$/g, when measured in a dried state of said laminar graphite structure without the presence of said electrolyte.

14. A supercapacitor electrode roll, having a roll length, roll width, and roll thickness and containing an electrolyte-impregnated laminar graphite structure, which is composed of multiple graphite flakes of exfoliated graphite or expanded graphite being alternately spaced by thin electrolyte layers, from 0.3 nm to 10 nm in thickness, wherein multiple graphite flakes are substantially aligned along a desired direction parallel to said roll length and roll width and perpendicular to said roll thickness, and wherein said laminar graphite structure has a physical density from 0.5 to 1.7 g/cm$^3$ and a specific surface area from 50 to 3,300 m$^2$/g, when measured in a dried state of said laminar graphite structure without said electrolyte.

15. The rolled supercapacitor of claim 1, which is a lithium-ion capacitor or sodium-ion capacitor, wherein said cathode contains said wound cathode roll of a cathode active material having flakes that are oriented substantially parallel to the plane defined by said cathode roll length and said cathode roll width; and said anode contains a pre-lithiated anode active material or a pre-sodiated anode active material.

16. The rolled supercapacitor of claim 15, wherein said anode contains a roll of a layer or two layers of a pre-lithiated anode active material or pre-sodiated anode active material layer coated on a solid or porous supporting substrate.

17. The rolled supercapacitor of claim 13, which is a lithium-ion capacitor or sodium-ion capacitor, wherein said cathode contains said wound cathode roll of a cathode active material having isolated graphene sheets that are oriented substantially parallel to the plane defined by said cathode roll length and said cathode roll width; and said anode contains a pre-lithiated anode active material or a pre-sodiated anode active material.

18. The rolled supercapacitor of claim 17, wherein said anode contains a roll of a layer or two layers of a pre-lithiated anode active material or pre-sodiated anode active material layer coated on a solid or porous supporting substrate.

19. A supercapacitor that contains a plurality of the rolled supercapacitors of claim 1 that are internally connected in series.

20. A supercapacitor that contains a plurality of the rolled supercapacitors of claim 1 that are internally connected in parallel.

21. A process for producing the rolled supercapacitor of claim 1, said process comprising:
   (A) preparing an anode roll by rolling or winding a layer of solid or porous supporting substrate coated or impregnated with an anode active material, an optional conductive additive, and an optional binder into a roll shape;
   (B) preparing a cathode roll by rolling or winding a layer of solid or porous supporting substrate coated or impregnated with a cathode active material, an optional conductive additive, and an optional binder into a roll shape; wherein at least said anode roll or said cathode roll contains flakes of exfoliated graphite or expanded graphite that are oriented perpendicular to said anode roll thickness or cathode roll thickness;
   (C) aligning and packing the anode roll, the cathode roll, and an ion-conducting separator layer between the anode roll and the cathode roll to form a supercapacitor assembly in such a manner that the anode roll width and/or the cathode roll width direction is substantially perpendicular to the separator plane; and
   (D) impregnating an electrolyte into the supercapacitor assembly before or after the supercapacitor assembly is inserted into a protective casing to form the rolled supercapacitor.

22. The process of claim 21, wherein porous supporting substrate contains an electrically conductive porous layer selected from metal foam, metal web or screen, perforated metal sheet-based structure, metal fiber mat, metal nanowire mat, conductive polymer nanofiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, or a combination thereof.

23. A process for producing the rolled supercapacitor of claim 1, said process comprising: (a) preparing an anode containing an anode active material, an optional conductive additive, and an optional binder; (b) preparing a cathode roll by rolling or winding a layer of solid or porous supporting substrate coated or impregnated with a cathode active material, an optional conductive additive, and an optional binder into a roll shape, wherein said cathode active material contains flakes of exfoliated graphite or expanded graphite that are oriented substantially parallel to the plane defined by said cathode roll length and said cathode roll width; (c) aligning and packing the anode, the cathode roll, and an ion-conducting separator layer between the anode and the cathode roll to form a supercapacitor assembly in such a manner that the cathode roll width direction is substantially perpendicular to the separator plane; and (d) impregnating an electrolyte into the supercapacitor assembly before or after the supercapacitor assembly is inserted into a protective casing to form the rolled supercapacitor.

24. A process for producing the rolled supercapacitor of claim 1, said process comprising: (a) preparing an anode roll by winding a layer of electrolyte-impregnated laminar graphite structure into a roll shape having an anode roll length, anode roll width, and anode roll thickness, wherein said electrolyte-impregnated laminar graphite structure is composed of multiple graphite flakes of exfoliated graphite worms or expanded graphite being alternately spaced by thin electrolyte layers, from 0.3 nm to 10 nm in thickness, wherein multiple graphite flakes are substantially aligned along a desired direction parallel to said anode roll length and anode roll width and perpendicular to said anode roll thickness, and wherein said laminar graphene structure has a physical density from 0.5 to 1.7 g/cm$^3$ and a specific surface area from 50 to 3,300 m$^2$/g, when measured in a dried state of said laminar graphite structure without said electrolyte; (b) preparing a cathode roll by winding a layer of electrolyte-impregnated laminar graphite structure into a roll shape having a cathode roll length, cathode roll width, and cathode roll thickness, wherein said electrolyte-impregnated laminar graphite structure is composed of multiple graphite flakes being alternately spaced by thin electrolyte layers, from 0.3 nm to 10 nm in thickness, wherein multiple graphite flakes are substantially aligned along a desired direction parallel to said cathode roll length and cathode roll width and perpendicular to said cathode roll thickness; (c) aligning the anode roll, the cathode roll, and an ion-conducting separator between the anode roll and the cathode roll together to form a supercapacitor assembly in such a manner that the anode roll width and/or cathode roll width direction is substantially perpendicular to the separator plane; and (d) sealing the supercapacitor assembly in a protective casing to form said rolled supercapacitor.

25. The process of claim 24, wherein said layer of electrolyte-impregnated laminar graphite structure in said anode roll or said cathode roll is prepared by a procedure comprising:
   (A) preparing a graphite dispersion having multiple flakes of graphite worms or expanded graphite dispersed in a liquid or gel electrolyte;
   (B) subjecting said graphite dispersion to a forced assembly procedure, forcing said multiple graphite flakes and said electrolyte to assemble into a layer of said electrolyte-impregnated laminar graphite structure having a layer plane and a layer thickness, wherein said multiple graphite flakes are alternately spaced by thin electrolyte layers, having a thickness from 0.4 nm to 10 nm, and said multiple graphite flakes are substantially aligned along a desired direction parallel to said layer plane and perpendicular to said layer thickness direction, and wherein said laminar graphite structure has a physical density from 0.5 to 1.7 g/cm$^3$ and a specific surface area from 50 to 3,300 m$^2$/g, when measured in a dried state of said laminar structure without said electrolyte; and
   (C) winding said layer of said electrolyte-impregnated laminar graphite structure into a roll shape.

26. The process of claim 25, wherein said forced assembly procedure includes introducing a first layer of said graphite dispersion onto a surface of a supporting conveyor and driving said layer of graphite dispersion supported on said conveyor through at least a pair of pressing rollers to reduce a thickness of said graphite dispersion layer and align said multiple graphite flakes along a direction parallel to said conveyor surface for forming a layer of electrolyte-impregnated laminar graphite structure.

27. The process of claim 26, further including a step of introducing a second layer of said graphite dispersion onto a surface of said layer of electrolyte-impregnated laminar graphite structure to form a two layer laminar structure, and driving said two-layer laminar structure through at least a pair of pressing rollers to reduce a thickness of said second layer of graphite dispersion and align said multiple graphite flakes along a direction parallel to said conveyor surface for forming a layer of electrolyte-impregnated laminar graphite structure.

28. The process of claim 26, further including a step of compressing or roll-pressing said electrolyte-impregnated laminar structure to reduce a thin electrolyte layer thickness in said impregnated laminar structure, improve orientation of graphite flakes, and squeeze excess electrolyte out of said impregnated laminar graphite structure for forming said supercapacitor electrode.

29. The process of claim 26, which is a roll-to-roll process wherein said forced assembly procedure includes feeding said supporting conveyor, in a continuous film form, from a feeder roller to a deposition zone, continuously or intermittently depositing said graphite dispersion onto a surface of said supporting conveyor film to form said layer of graphite dispersion thereon, and collecting said layer of electrolyte-impregnated laminar graphite structure supported on said conveyor film on a collector roller.

30. The process of claim 26, further comprising a step of cutting or slitting said electrolyte-impregnated laminar graphite structure into multiple sheets of desired dimensions prior to being wound into multiple rolls.

31. The process of claim 26, further comprising a step of attaching said electrolyte-impregnated laminar graphite structure to a current collector, wherein said graphite flakes are aligned parallel to a primary surface of said current collector.

* * * * *